(12) United States Patent
Fields

(10) Patent No.: US 12,169,805 B2
(45) Date of Patent: Dec. 17, 2024

(54) VEHICLE DRIVER SAFETY PERFORMANCE BASED ON RELATIVITY

(71) Applicant: State Farm Mutual Automobile Insurance Company, Bloomington, IL (US)

(72) Inventor: Brian Mark Fields, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/463,434

(22) Filed: Sep. 8, 2023

(65) Prior Publication Data

US 2023/0419229 A1   Dec. 28, 2023

Related U.S. Application Data

(63) Continuation of application No. 17/833,410, filed on Jun. 6, 2022, now Pat. No. 11,783,264, which is a (Continued)

(51) Int. Cl.
G06Q 10/0639     (2023.01)

(52) U.S. Cl.
CPC ................ *G06Q 10/0639* (2013.01)

(58) Field of Classification Search
None
See application file for complete search history.

(56) References Cited

U.S. PATENT DOCUMENTS

| | | |
|---|---|---|
| 8,831,813 B1 | 9/2014 | Ferguson et al. |
| 8,876,535 B2 | 11/2014 | Fields et al. |

(Continued)

FOREIGN PATENT DOCUMENTS

| | | |
|---|---|---|
| EP | 3239686 | 11/2017 |
| EP | 3578433 A1 | 4/2019 |

(Continued)

OTHER PUBLICATIONS

Lin Pu et. al., "Implementing On-Board Diagnostic and GPS on VANET to Safe the Vehicle," 2015, 2015 International Conference on Connected Vehicles and Expo, pp. 13-18 (Year: 2015).*

(Continued)

*Primary Examiner* — Amanda Gurski
(74) *Attorney, Agent, or Firm* — Lee & Hayes, P.C.

(57) ABSTRACT

Systems, methods, and techniques for determining optimal safe driving behaviors and optimal safety thresholds of the various parameters for particular routes are disclosed. Historical driver data for a plurality of drivers operating vehicles over various routes during different contextual situations and/or different combinations of conditions along the routes is analyzed to determine respective, relative weightings/contributions of various parameters towards driving safety. Data indicative of a particular driver's behavior along a particular route during a particular set of conditions or contexts is obtained and compared to the analysis results to thereby determine or assess the driver's safety performance. The driver's safety performance may be evaluated in real-time, e.g., based on up-to-the-minute or currently obtained drivers' data, so as to provide the driver with evaluation results, provide the driver with suggestions for improving driving safety, and/or automatically adjust an operation of the vehicle while the vehicle is traversing the particular route.

20 Claims, 5 Drawing Sheets

Related U.S. Application Data continuation of application No. 15/592,503, filed on May 11, 2017, now Pat. No. 11,354,616.

(56) References Cited

U.S. PATENT DOCUMENTS

| | | | |
|---|---|---|---|
| 8,930,229 B2 | 1/2015 | Bowne et al. | |
| 8,930,231 B2 | 1/2015 | Bowne et al. | |
| 9,056,616 B1 | 6/2015 | Fields et al. | |
| 9,180,888 B1 | 11/2015 | Fields et al. | |
| 9,262,787 B2 | 2/2016 | Binion et al. | |
| 9,275,552 B1 | 3/2016 | Fields et al. | |
| 9,297,697 B2 | 3/2016 | Mujtaba et al. | |
| 9,311,271 B2 | 4/2016 | Wright | |
| 9,324,192 B2 | 4/2016 | Chakravarty et al. | |
| 9,342,993 B1 | 5/2016 | Fields et al. | |
| 9,361,599 B1 | 6/2016 | Biemer et al. | |
| 9,373,203 B1 | 6/2016 | Fields et al. | |
| 9,390,452 B1 | 7/2016 | Biemer et al. | |
| 9,424,751 B2 | 8/2016 | Hodges et al. | |
| 9,478,150 B1 | 10/2016 | Fields et al. | |
| 9,530,333 B1 | 12/2016 | Fields et al. | |
| 9,569,984 B2 | 2/2017 | Stankoulov | |
| 9,586,591 B1 | 3/2017 | Fields et al. | |
| 9,633,487 B2 | 4/2017 | Wright | |
| 9,751,535 B1 | 9/2017 | Fields et al. | |
| 9,764,742 B1 * | 9/2017 | Goldfarb | G07C 5/008 |
| 9,817,399 B2 | 11/2017 | Braunstein et al. | |
| 9,830,748 B2 | 11/2017 | Rosenbaum | |
| 9,847,043 B1 | 12/2017 | Fields et al. | |
| 9,955,319 B2 | 4/2018 | Matus et al. | |
| 9,959,780 B2 | 5/2018 | Fields et al. | |
| 9,990,782 B2 | 6/2018 | Rosenbaum | |
| 10,192,369 B2 | 1/2019 | Wright | |
| 10,198,879 B2 | 2/2019 | Wright | |
| 10,269,190 B2 | 4/2019 | Rosenbaum | |
| 10,395,526 B1 * | 8/2019 | Slusar | G08G 1/0116 |
| 10,414,407 B1 | 9/2019 | Slusar | |
| 10,430,695 B2 | 10/2019 | Sathyanarayana et al. | |
| 10,467,824 B2 | 11/2019 | Rosenbaum | |
| 10,493,994 B1 | 12/2019 | Fields | |
| 10,713,717 B1 | 7/2020 | Hanson et al. | |
| 10,915,964 B1 * | 2/2021 | Purgatorio | G06Q 40/08 |
| 11,180,150 B2 | 11/2021 | Engel et al. | |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,560,177 B1 | 1/2023 | Fields | |
| 11,594,083 B1 | 2/2023 | Rosenbaum | |
| 2009/0114463 A1 | 5/2009 | DeVault | |
| 2010/0256835 A1 | 10/2010 | Mudalige | |
| 2011/0246010 A1 | 10/2011 | de la Torre Bueno | |
| 2011/0307188 A1 | 12/2011 | Peng et al. | |
| 2013/0006675 A1 * | 1/2013 | Bowne | G01S 19/13 |
| | | | 705/4 |
| 2013/0008521 A1 * | 1/2013 | Klug | A62C 37/14 |
| | | | 137/72 |
| 2013/0024060 A1 | 1/2013 | Sukkarie et al. | |
| 2013/0211660 A1 * | 8/2013 | Mitchell | G06Q 10/0639 |
| | | | 701/29.3 |
| 2014/0032015 A1 | 1/2014 | Chun et al. | |
| 2014/0162219 A1 * | 6/2014 | Stankoulov | G09B 19/167 |
| | | | 434/65 |
| 2014/0199662 A1 | 7/2014 | Armitage et al. | |
| 2015/0019266 A1 | 1/2015 | Stempora | |
| 2015/0025917 A1 | 1/2015 | Stempora | |
| 2015/0046197 A1 | 2/2015 | Peng et al. | |
| 2015/0160019 A1 | 6/2015 | Biswal et al. | |
| 2015/0262435 A1 | 9/2015 | Delong et al. | |
| 2016/0114698 A1 | 4/2016 | Chow et al. | |
| 2016/0117928 A1 | 4/2016 | Hodges et al. | |
| 2016/0195406 A1 | 7/2016 | Miles et al. | |
| 2016/0196613 A1 | 7/2016 | Miles et al. | |
| 2016/0198306 A1 | 7/2016 | Miles et al. | |
| 2017/0008521 A1 * | 1/2017 | Braunstein | G01S 5/0027 |
| 2017/0015318 A1 | 1/2017 | Scofield et al. | |
| 2017/0032673 A1 | 2/2017 | Scofield et al. | |
| 2017/0291608 A1 | 10/2017 | Engel et al. | |
| 2017/0313332 A1 | 11/2017 | Paget et al. | |
| 2017/0329332 A1 | 11/2017 | Pilarski | |
| 2018/0001899 A1 | 1/2018 | Shenoy et al. | |
| 2018/0032072 A1 | 2/2018 | Hoye | |
| 2018/0060970 A1 | 3/2018 | Oduor et al. | |
| 2018/0077538 A1 | 3/2018 | Matus et al. | |
| 2018/0208195 A1 | 7/2018 | Hutcheson et al. | |
| 2018/0365533 A1 | 12/2018 | Sathyanarayana et al. | |
| 2019/0025826 A1 | 1/2019 | Lin | |
| 2019/0031193 A1 | 1/2019 | Kojima | |
| 2022/0092893 A1 | 3/2022 | Rosenbaum | |
| 2022/0300877 A1 | 9/2022 | Fields | |
| 2022/0340148 A1 | 10/2022 | Rosenbaum | |
| 2023/0060300 A1 | 3/2023 | Rosenbaum | |
| 2023/0062843 A1 | 3/2023 | Fields | |
| 2023/0159102 A1 | 5/2023 | Fields | |

FOREIGN PATENT DOCUMENTS

| | | | |
|---|---|---|---|
| EP | 3730375 A1 | 4/2020 | |
| EP | 3960576 A1 | 3/2022 | |
| EP | 4190659 | 6/2023 | |
| EP | 4190660 A1 | 6/2023 | |
| WO | WO2020193863 | 10/2020 | |
| WO | WO-2020193863 A1 * | 10/2020 | B60W 40/06 |

OTHER PUBLICATIONS

Pu, et al., "Implementing On-Board Diagnostic and GPS on VANET to Safe the Vehicle", 2015 International Conference on Connected Vehicles and Expo, 2015, pp. 13-18.

Dikmen, et al., "Autonomous Driving in the Real World: Experiences with Tesla Autopilot and Summon", 8th International Conference on Automotive USer Interfaces and Interactive Vehicular Applications, 2016, pp. 225-228.

Keonyup, et al., "Local Path Planning for Off-Road Autonomous Driving With Avoidance of Static Obstacles", IEEE Transactions on Intelligent Transportation Systems, vol. 13, No. 4, 2012, pp. 1599-1616.

Office Action for U.S. Appl. No. 15/596,495, mailed on Mar. 10, 2023, Fields, "Autonomous Vehicle Operation Based on Real-Time Analytics", 40 pages.

Final Office Action dated Mar. 16, 2020 for U.S. Appl. No. 15/703,648 "Real-Time Vehicle Driver Feedback Based on Analytics", Fields, 42 pages.

Office Action for U.S. Appl. No. 18/100,205, mailed on Jun. 23, 2023, Fields, "Real-Time Vehicle Driver Feedback Based on Analytics" 14 pages.

Office Action for U.S. Appl. No. 15/596,495, mailed on Jun. 23, 2023, Fields, "Autonomous Vehicle Operation Based on Real-Time Analytics", 40 pages.

Non Final Office Action dated Jul. 22, 2020 for U.S. Appl. No. 15/703,648, "Real-Time Vehicle Driver Feedback Based on Analytics", Fields, 21 pages.

Non Final Office Action dated Aug. 26, 2020 for U.S. Appl. No. 15/592,503, "Vehicle Driver Safety Performance Based on Relativity", Fields, 28 pages.

Office Action for U.S. Appl. No. 17/833,410, mailed on Jan. 13, 2023, Fields, "Vehicle Driver Safety Performance Based on Relativity", 32 pages.

Office Action for U.S. Appl. No. 15/596,495, mailed on Oct. 6, 2021, Fields, "Autonomous Vehicle Operation Based on Real-Time Analytics", 39 Pages.

Office Action for U.S. Appl. No. 15/703,648, mailed on Nov. 30, 2021, Fields, "Real-Time Vehicle Driver Feedback Based on Analytics", 33 Pages.

Final Office Action dated Dec. 9, 2020 for U.S. Appl. No. 15/596,495, "Autonomous Vehicle Operation Based on Real-Time Analytics", Fields, 32 pages.

Final Office Action dated Dec. 30, 2019 for U.S. Appl. No. 15/596,495 "Autonomous Vehicle Operation Based on Real-Time Analytics" Fields, 6 pages.

(56) References Cited

OTHER PUBLICATIONS

Office Action dated Feb. 22, 2021 for U.S. Appl. No. 15/703,648 "Real-Time Vehicle Driver Feedback Based on Analytics", Fields, 23pages.
Final Office Action dated Mar. 23, 2020 for U.S. Appl. No. 15/592,503 "Vehicle Driver Safety Performance Based on Relativity" Fields, 29 pages.
Non Final Office Action dated Mar. 8, 2021 for U.S. Appl. No. 15/592,503, "Vehicle Driver Safety Performance Based on Relativity", Fields, 28 pages.
Office Action for U.S. Appl. No. 16/669,228, mailed on Apr. 20, 2022, Fields, "Vehicle Driver Performance Based on Contextual Changes and Driver Response", 11 Pages.
Office Action for U.S. Appl. No. 15/596,495, mailed on Apr. 28, 2022, Fields, "Autonomous Vehicle Operation Based on Real-Time Analytics", 35 pages.
Non Final Office Action dated May 29, 2020 for U.S. Appl. No. 15/596,495 "Autonomous Vehicle Operation Based on Real-Time Analytics" Fields, 28 pages.
Office Action for U.S. Appl. No. 15/703,648, mailed on Jul. 13, 2021, Fields, "Real-Time Vehicle Driver Feedback Based on Analytics", 27 pages.
Office Action for U.S. Appl. No. 15/596,495, mailed on Aug. 17, 2022, Fields, "Autonomous Vehicle Operation Based on Real-Time Analytics", 38 pages.
Office Action for U.S. Appl. No. 17/833,410, mailed on Sep. 22, 2022, Gurski, "833VEHICLE Driver Safety Performance Based on Relativity", 27 Pages.

\* cited by examiner

VEHICLE DRIVER SAFETY PERFORMANCE BASED ON RELATIVITY

CROSS REFERENCE TO RELATED APPLICATIONS

This application is a continuation of and claims priority to U.S. application Ser. No. 17/833,410 filed Jun. 6, 2022 and entitled "Vehicle Driver Safety Performance Based On Relativity," which is a continuation of and claims priority to U.S. application Ser. No. 15/592,503, filed on May 11, 2017 and entitled "Vehicle Driver Safety Performance Based On Relativity," issued as U.S. Pat. No. 11,354,616 on Jun. 7, 2022, the entire contents of which are incorporated herein by reference.

FIELD OF DISCLOSURE

The present disclosure generally relates to systems and methods for determining or rating a vehicle driver's safety performance in relation to other drivers' performances in similar contextual situations.

BACKGROUND

Vehicles are typically operated by a human vehicle operator (e.g., a vehicle driver) who controls both steering and motive controls. Currently known methods for determining or rating a driver's performance typically include collecting telematics data from the driver's vehicle while a driver operates the vehicle, and analyzing the collected data to generate a rating or determination of the driver's performance in operating the vehicle. Typical telematics data that is collected to rate a driver's performance includes vehicle movement data such as speed, acceleration, cornering, braking, and the like. Other data that is conventionally used in rating a driver's performance include the time of day, miles traveled, and whether (or not) and/or where the vehicle is garaged. Conventionally, a driver's performance rating is reflected by an average over a period of time, such as a six-month or yearly average.

SUMMARY

The present disclosure generally relates to systems and methods for determining or rating driver safety performance based on relativity, e.g., to other drivers and/or to particular combinations of environmental conditions or contexts. Embodiments of example systems and methods are summarized below. The methods and systems summarized below may include additional, less, or alternate actions, including those discussed elsewhere herein.

In an embodiment, a system for determining driver performance may comprise one or more communication interfaces; an access mechanism to a first set of data indicative of respective behavior of a plurality of drivers of a plurality of vehicles that traverse a plurality of routes, where the first set of data is based on data obtained by a set of sensors while the plurality of drivers operate respective vehicles along the plurality of routes; one or more processors; one or more non-transitory memories coupled to the one or more processors; and computer-executable instructions stored on the one or more non-transitory memories thereby particularly configuring the one or more non-transitory memories. The computer-executable instructions, when executed by the one or more processors, may cause the system to collect a second set of data, where at least a portion of the second set of data is obtained by a set of sensors disposed at a particular vehicle that is operated by a particular driver over a particular route, and each data point included in the second set of data is associated with a respective geospatial location included in the particular route; filter, using the access mechanism, the first set of data based on the particular route to obtain a subset of the first set of data corresponding to the particular route; and analyze the subset of the first set of data corresponding to the particular route to determine relative weightings amongst a plurality of different parameters whose values are included in the subset of the first set of data, where the plurality of different parameters is indicative of at least one of a behavior of the particular driver, a behavior of the vehicle, or an environmental condition of the particular route, and the relative weightings correspond to one or more levels of driving performance. Additionally, the computer-executable instructions, when executed by the one or more processors, may further cause the system to compare the second set of data corresponding to the particular driver with the analyzed subset of the first set of data; determine a level of driving performance of the particular driver based on the comparison; and transmit an indication of the determined level of driving performance of the particular driver corresponding to the particular route to at least one of: the particular vehicle operated by the particular driver, a user interface, or another computing device or system.

In an embodiment, a method for determining driver performance may comprise collecting, by one or more computing devices communicatively connected to a set of sensors disposed at a particular vehicle, a first set of data, where at least a portion of the first set of data is obtained by the set of sensors while the particular vehicle is operated by a particular driver over a particular route, and each data point included in the first set of data is associated with a respective geospatial location included in the particular route; accessing a second set of data indicative of respective behaviors of a plurality of drivers of a plurality of vehicles traversing a plurality of routes, where the second set of data is based on data obtained by a plurality of sensors while the plurality of drivers operated respective vehicles along the plurality of routes, and the plurality of routes includes the particular route; and filtering the second set of data based on the particular route to obtain a subset of the second set of data corresponding to the particular route. The method may further comprise analyzing the subset of the second set of data corresponding to the particular route to determine relative weightings amongst a plurality of different parameters whose values are included in the subset of the second set of data, where the plurality of different parameters is indicative of at least one of a behavior of the particular driver, a behavior of the vehicle, or an environmental condition of the particular route, and the relative weightings correspond to one or more levels of driving performance; comparing the first set of data corresponding to the particular driver with analyzed subset of the second set of data; determining a level of driving performance of the particular driver for the particular route based on the comparison; and transmitting an indication of the level of driving performance of the particular driver to at least one of: the particular vehicle being operated by the particular driver, a user interface, or another computing device or system.

Systems or computer-readable media storing executable instructions for implementing all or part of the systems and/or methods described herein may also be provided in some embodiments. Systems for implementing such methods may include one or more of the following: a special-purpose computing device, a mobile computing device, a personal electronic device, an on-board computer, one or more remote servers or cloud computing system, one or more remote data storage entities, one or more sensors, one or more communication modules configured to communicate wirelessly via radio links, radio frequency links, and/or wireless communication channels, and/or one or more non-transitory, tangible program memories coupled to one or more processors of the special-purpose computing device, mobile computing device, personal electronic device, on-board computer, and/or one or more remote servers or cloud computing system. Such program memories may store instructions, which, when executed by the one or more processors, may cause a system described herein to implement part or all of one or more methods described herein. Additional or alternative features described herein below may be included in some embodiments.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1A:
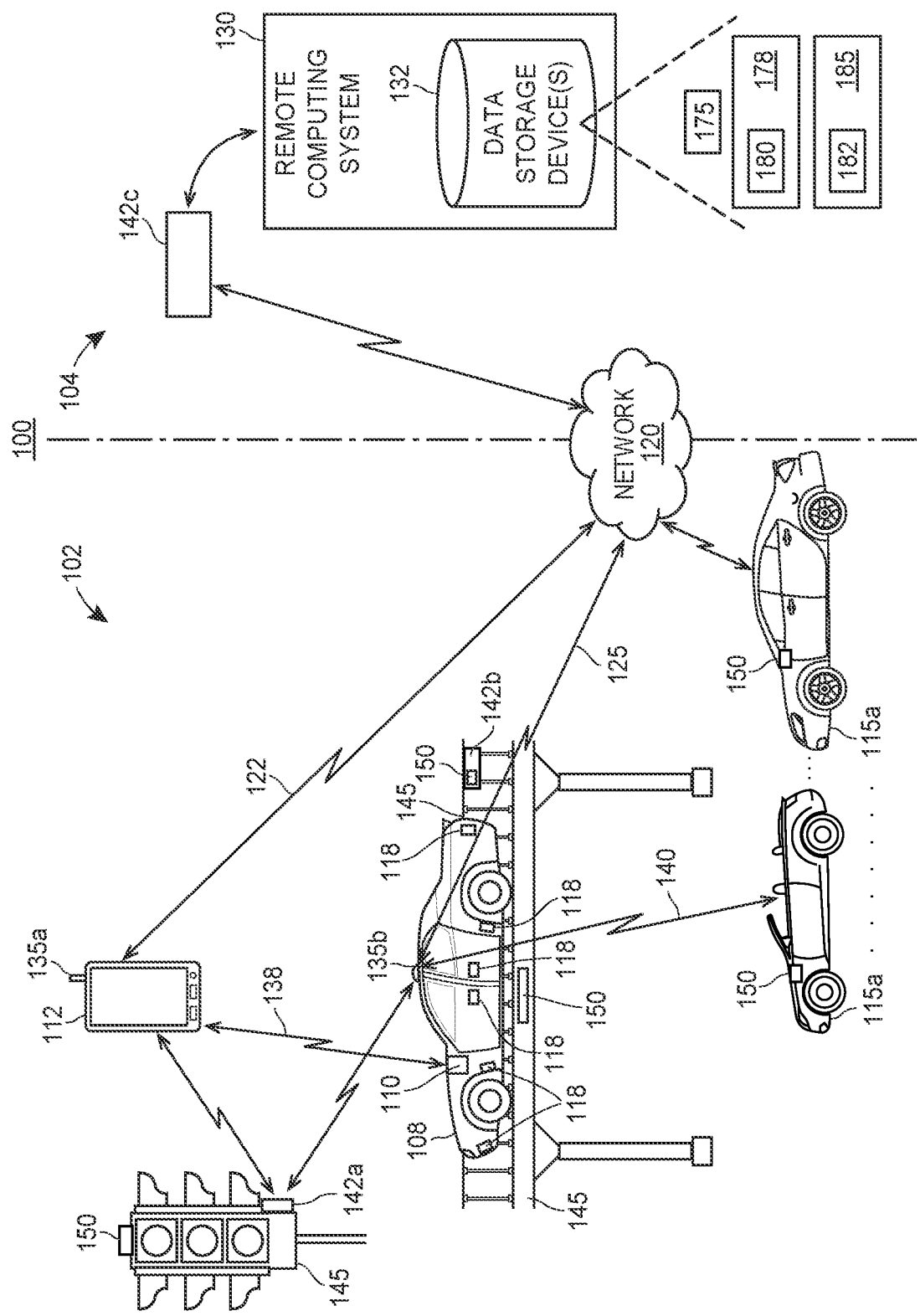
FIG. 1A illustrates a block diagram of an exemplary system for determining a vehicle driver's performance based on relativity.

Currently known techniques for determining or rating a driver's performance typically include collecting telematics data from a vehicle while a driver operates the vehicle, and analyzing the collected data to generate a rating or determination of the driver's performance in operating the vehicle. Typical telematics data that is collected to rate a driver's performance includes vehicle movement data such as speed, acceleration, cornering, braking, and the like, and comparing the collected driver data against pre-determined thresholds. Other data that is often used in rating a driver's performance include the time of day, miles traveled, and whether (or not) and/or where the vehicle is garaged. Conventionally, a driver's performance rating is reflected by an average over a period of time, such as a six-month or yearly average.

An example of such an known method for determining or rating a driver's performance is described in U.S. Patent Publication No. 20160198306 ("the '306 publication"), which shares a common assignee with the present disclosure, and whose contents are hereby incorporated by reference herein in their entirety. Generally speaking, the '306 publication describes obtaining data from sensors disposed at a vehicle while a driver is operating the vehicle. The vehicle sensor data may be analyzed together with relevant contextual data, such as data indicative of the location and/or driving environment in which the driver is operating the vehicle. Contextual data which may include, for example, the type of road on which the vehicle is traveling, the speed limit, traffic signs and lights, traffic density, weather, etc. Different "notable driving events," such as instances of notable acceleration, braking, and cornering which may be indicative of unsafe behavior, as well as the severity of such events, may be identified based on the vehicle sensor data, the contextual data, and pre-determined thresholds which delineate levels of safe driving behavior. For example, different thresholds may be used for identifying a notable cornering driving event in dry weather conditions, rainy weather conditions, and icy weather conditions. In another example, different thresholds may be used for identifying a notable braking driving event for highway driving, non-highway driving, low-traffic driving, high-traffic driving, approaching a stop sign intersection, approaching a stop light intersection, etc. Thus, currently known techniques for determining or rating a driver's performance typically compare vehicle data that is obtained while the driver is operating the vehicle against one or more pre-determined thresholds to determine the driver's safety performance, and notable driving events which may be indicative of unsafe driver performance may be determined based on the comparison of the driver's data against the pre-determined thresholds.

Currently known techniques, though, do not take into account how the various pre-determined threshold values are selected or set, and do not take into account how various dynamic contextual conditions, either alone or in combination, affect how the values of the pre-determined thresholds should be set. For example, in currently known techniques, a first pre-determined threshold for a safe, maximum speed limit on a particular stretch of highway may be defined for wet weather, and a second, different pre-determined threshold for a safe, maximum speed limit may be defined for the same stretch of highway for dry weather. However, in some situations, the safest speed at which a vehicle should be traveling, e.g., for dry weather, is with the flow of traffic, which may be at a greater speed than the pre-determined "maximum safest dry weather speed" threshold. Currently known techniques are not able to distinguish such a situation, and would flag vehicle speed in excess of the pre-determined dry weather threshold as a potentially unsafe driving event. In another example, when a driver swerves to avoid an accident, currently known techniques may flag the swerve as an unsafe driving event due to the detected G-Force(s) exceeding a pre-determined threshold, even if the swerving may have been the safest course of action for the driver to take to avoid the accident for the given set of conditions.

The novel techniques, systems, and methods disclosed herein, though, are able to determine optimal safe driving behaviors and optimal safety thresholds for various parameters in different contextual situations and/or for different combinations of conditions along particular routes. Furthermore, unlike the currently known techniques for determining safe driver performance, the thresholds utilized by the novel techniques are able to be dynamically updated and adjusted in real-time and/or a driver's safety performance is able to be evaluated in real-time while the driver is operating a vehicle over a particular route so that the driver may be provided with an indication of his or her current driving safety performance and/or with one or more suggestions that may immediately improve his or her driving safety while operating the vehicle over the particular route. Additionally or alternatively, in some embodiments, one or more operations of the vehicle may be automatically adjusted or modified based on the current, detected driver safety performance while the driver is operating vehicle over the particular route.

Accordingly, the present disclosure is able to provide a more accurate or granular determination of a driver's safety performance, which may then be utilized for any number of useful applications such as determining risk, adjusting operations of the vehicle and/or of other surrounding vehicles (e.g., of fully and/or semi-autonomous vehicles operating in the vicinity of the vehicle), training and/or educating the driver, and the like. Generally speaking, the novel techniques, systems and methods disclosed herein may determine or rate a driver's safety performance based on relativity to other drivers' behavior in similar situations, and/or based on relative weights of the respective impact of different contextual conditions on driver safety.

FIG. 1A illustrates a block diagram of an exemplary system 100 for determining the performance of the driver of a vehicle based on relativity. The high-level architecture illustrated in FIG. 1A may include both hardware and software applications, as well as various data communications channels for communicating data between the various hardware and software components, as is described below. The system 100 may be roughly divided into front-end components 102 and back-end components 104. The front-end components 102 may obtain information regarding a vehicle 108 (e.g., a car, truck, motorcycle, etc.) that is being operated by driver and regarding the context and surrounding environment in which the vehicle 108 is being operated. One or more on-board computers 110 and/or one or more mobile devices 112 that are included in the front-end components 102 and disposed at the vehicle 108 may utilize this information to, for example, notify or alert the driver of the vehicle 108, notify or alert other drivers and other vehicles 115a-115n that are operating in the surrounding environment, automatically change an operating behavior of the vehicle 108 and/or of any one or more of the other vehicles 115a-115n, and/or to assist the driver in operating the vehicle 108. The one or more on-board computers 110 may be permanently or removably installed in the vehicle 108, and the one or more mobile devices 112 may be disposed at and transported by the vehicle 108, for example.

Generally speaking, the on-board computer 110 may be an on-board computing device capable of performing various functions relating to vehicle operations and determining driver performance. That is, the on-board computer 110 may be particularly configured with particular elements to thereby be able to perform functions relating to determining driver performance and/or vehicle operations. Further, the on-board computer 110 may be installed by the manufacturer of the vehicle 108, or as an aftermarket modification or addition to the vehicle 108. In FIG. 1A, although only one on-board computer 110 is depicted, it should be understood that in some embodiments, a plurality of on-board computers 110 (which may be installed at one or more locations within the vehicle 108) may be used. However, for ease of reading and not for limitation purposes, the on-board computing device or computer 110 is referred to herein using the singular tense.

The mobile device 112 may be transported by the vehicle 108 and may be, for example, a personal computer or personal electronic device (PED), cellular phone, smart phone, tablet computer, smart watch, wearable electronics, or a dedicated vehicle monitoring or control device which may be releasably attached to the vehicle 108. Although only one mobile device 112 is illustrated in FIG. 1A, it should be understood that in some embodiments, a plurality of mobile devices 112 may be included in the system 100. For ease of reading and not for limitation purposes, though, the mobile device 112 is referred to herein using the singular tense.

Further, it is noted that, in some embodiments, the on-board computer 110 may operate in conjunction with the mobile device 112 to perform any or all of the functions described herein as being performed on-board the vehicle 108. In other embodiments, the on-board computer 110 may perform all of the on-board vehicle functions described herein, in which case either no mobile device 112 is being transported by the vehicle 108, or any mobile device 112 that is being transported by the vehicle 108 is ignorant or unaware of vehicle and driver operations. In still other embodiments, the mobile device 112 may perform all of the onboard vehicle functions described herein. Still further, in some embodiments, the on-board computer 110 and/or the mobile device 112 may perform any or all of the functions described herein in conjunction with one or more back-end components 104. For example, in some embodiments or under certain conditions, the mobile device 112 and/or on-board computer 110 may function as thin-client devices that outsource some or most of the processing to one or more of the back-end components 104.

At any rate, the on-board computing device 110 and/or the mobile device 112 disposed at the vehicle 108 may communicatively interface with one or more on-board sensors 118 that are disposed on or within the vehicle 108 and that may be utilized to monitor the vehicle 108 and the environment in which the vehicle 108 is operating. That is, the one or more on-board sensors 118 may sense conditions associated with the vehicle 108 and/or associated with the environment in which the vehicle 108 is operating, and may collect data indicative of the sensed conditions. In some configurations, at least some of the on-board sensors 118 may be fixedly disposed at various locations on the vehicle 108. Additionally or alternatively, at least some of the on-board sensors may be incorporated within or connected to the on-board computer 110. Still additionally or alternatively, in some configurations, at least some of the on-board sensors 118 may be included on or within the mobile device 112. Whether disposed at or on the vehicle 108 or disposed at or on a mobile device 112 being transported by the vehicle 108, though, the one or more of the sensors 118 are generally referred to herein as "on-board sensors 118," and the data collected by the on-board sensors 118 is generally referred to herein as "sensor data," "on-board sensor data," or "vehicle sensor data." The on-board sensors 118 may communicate respective sensor data to the on-board computer 110 and/or to the mobile device 112, and the sensor data may be processed using the on-board computer 110 and/or the mobile device 112 to determine when the vehicle is in operation as well as determine information regarding the vehicle 108, the vehicle's operating behavior, and/or the driver's operating behavior and performance. In some situations, the on-board sensors 118 may communicate respective sensor data indicative of the environment in which the vehicle 108 is operating.

As discussed above, at least some of the on-board sensors 118 associated with the vehicle 108 may be removably or fixedly disposed within or at the vehicle 108, and further may be disposed in various arrangements and at various locations to sense and provide information. The sensors 118 that are installed at the vehicle 108 may include one or more of a GPS unit, a radar unit, a LIDAR unit, an ultrasonic sensor, an infrared sensor, some other type of electromagnetic energy sensor, an inductance sensor, a camera, an accelerometer, an odometer, a system clock, a gyroscope, a compass, a geo-location or geo-positioning unit, a location tracking sensor, a proximity sensor, a tachometer, and/or a speedometer, to name a few. Some of the on-board sensors 118 (e.g., GPS, accelerometer, or tachometer units) may provide sensor data indicative of, for example, the vehicle's location, speed, position acceleration, direction, responsiveness to controls, movement, etc. Other sensors 118 that are disposed at the vehicle 108 may be directed to the interior or passenger compartment of the vehicle 108, such as cameras, microphones, pressure sensors, weight sensors, thermometers, or similar sensors to monitor the vehicle operator, any passengers, operations of instruments included in the vehicle, operational behaviors of the vehicle, and/or conditions within the vehicle 108. For example, on-board sensors 118 directed to the interior of the vehicle 108 may provide sensor data indicative of, for example, in-cabin temperatures, in-cabin noise levels, data from seat sensors (e.g., indicative of whether or not a person is using a seat, and thus the number of passengers being transported by the vehicle 108), data from seat belt sensors, data regarding the operations of user controlled devices such as windshield wipers, defrosters, traction control, mirror adjustment, interactions with on-board user interfaces, etc. Some of the sensors 118 disposed at the vehicle 108 (e.g., radar, LIDAR, camera, or other types of units that operate by using electromagnetic energy) may actively or passively scan the environment external to the vehicle 108 for obstacles (e.g., other vehicles, buildings, pedestrians, trees, gates, barriers, animals, etc.) and their movement, weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the vehicle's environment. Information or data that is generated or received by the on-board sensors 118 may be communicated to the on-board computer 110 and/or to the mobile device 112, for example.

In some embodiments of the system 100, the front-end components 102 may communicate collected sensor data to the back-end components 104, e.g., via a network 120. For example, at least one of the on-board computer 110 or the mobile device 112 may communicate with the back-end components 104 via the network 120 to allow the back-end components 104 to record collected sensor data and information regarding vehicle usage. The network 120 may include a proprietary network, a secure public internet, a virtual private network, and/or some other type of network, such as dedicated access lines, plain ordinary telephone lines, satellite links, cellular data networks, combinations of these and/or other types of networks. The network 120 may utilize one or more radio frequency communication links to communicatively connect to the vehicle 108, e.g., utilize wireless communication links 122 and 125 to communicatively connect with mobile device 112 and on-board computer 110, respectively. Where the network 120 comprises the Internet or other data packet network, data communications may take place over the network 120 via an Internet or other suitable data packet communication protocol. In some arrangements, the network 120 additionally or alternatively includes one or more wired communication links or networks.

Figure 1B:
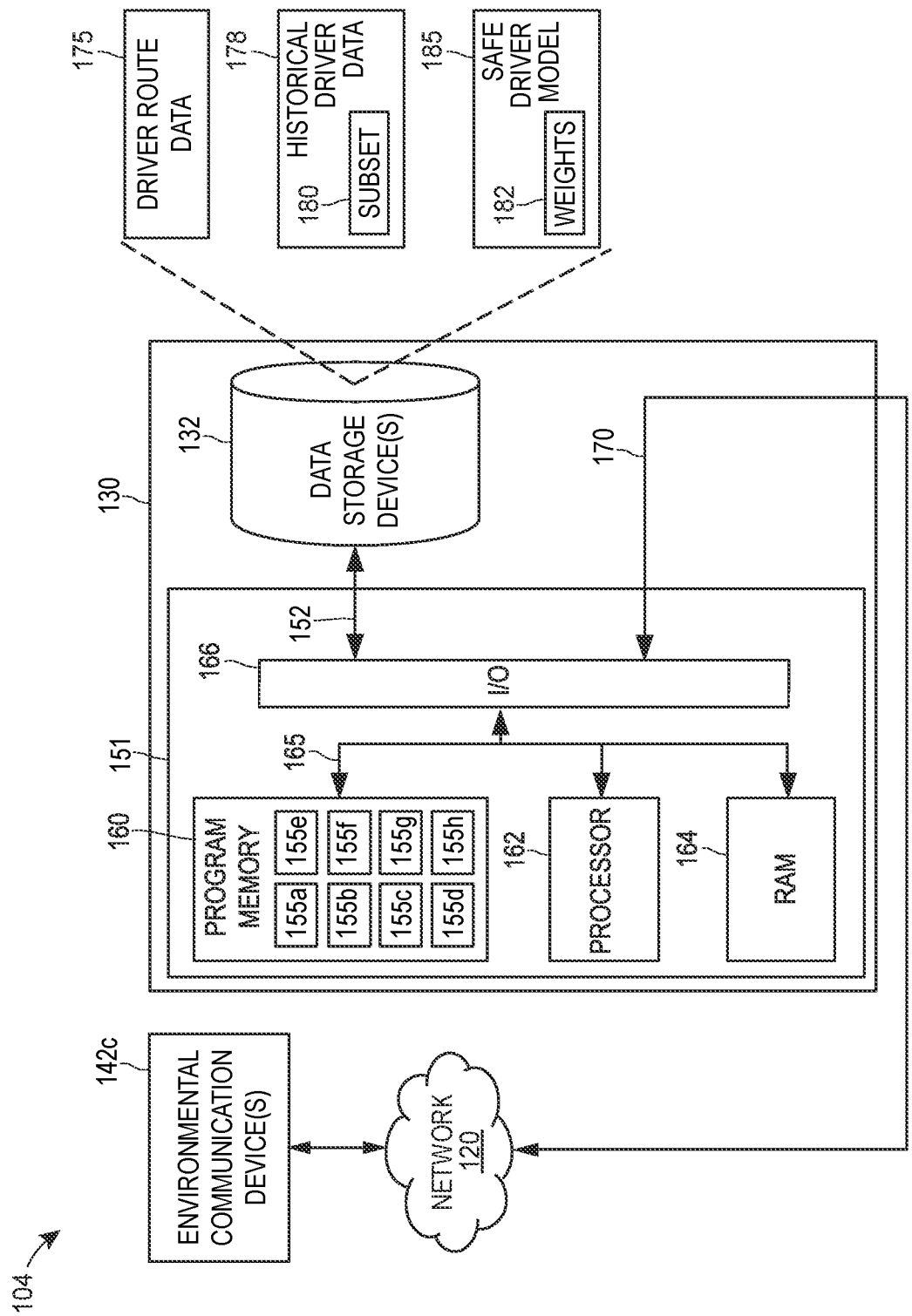
FIG. 1B illustrates a more detailed block diagram of the back-end components of the exemplary system shown in FIG. 1A.

The back-end components 104 include one or more servers or computing devices, which may be implemented as a server bank or cloud computing system 130, and is interchangeably referred to herein as a "remote computing system 130." The remote computing system 130 may include one or more computer processors adapted and configured to execute various software applications and components of the system 100, in addition to other software applications. The remote computing system 130 may further include or be communicatively connected to one or more data storage devices or entities 132, which may be adapted to store data related to the operation of the vehicle 108, driver performance, the environment and context in which the vehicle 108 is operating, and/or other information. For example, the one or more data storage devices 132 may be implemented as a data bank or a cloud data storage system, at least a portion of which may be included in and/or locally accessed by the remote computing system 130 (for example, as illustrated in FIG. 1A) using a local access mechanism such as a function call or database access mechanism, and/or at least a portion of which may be remotely accessed by the remote computing system 130 (for example, as illustrated in FIG. 1B) using a remote access mechanism such as a communication protocol. Thus, although only one data storage device 132 is illustrated in FIGS. 1A and 1B, it is understood that in some embodiments, a plurality of data storage devices or entities 132 may be included in the system 100. For ease of reading and not for limitation purposes, though, the data storage device 132 is referred to herein using the singular tense. The remote computing system 130 may access data stored in the data storage device 132 when executing various functions and tasks associated with the present disclosure.

To communicate with the remote computing system 130 and other portions of the back-end components 104, the front-end components 102 may include one or more communication components 135a, 135b that are configured to transmit information to and receive information from the back-end components 104 and, in some embodiments, transmit information to and receive information from other external sources, such as other vehicles and/or infrastructure or environmental components disposed within the vehicle's environment. The one or more communication components 135a, 135b may include one or more wireless transmitters or transceivers operating at any desired or suitable frequency or frequencies. Different wireless transmitters or transceivers may operate at different frequencies and/or by using different protocols, if desired. In an example, the mobile device 112 may include a respective communication component 135a for sending or receiving information to and from the remote computing system 130 via the network 120, such as over one or more radio frequency links or wireless communication channels 122 which support a first communication protocol (e.g., GSM, CDMA, LTE, one or more IEEE 802.11 Standards such as Wi-Fi, WiMAX, BLUETOOTH, etc.). Additionally or alternatively, the on-board computer 110 may operate in conjunction with an on-board transceiver or transmitter 135b that is disposed at the vehicle 108 (which may, for example, be fixedly attached to the vehicle 108) for sending or receiving information to and from the remote computing system 130 via the network 120, such as over one or more radio frequency links or wireless communication channels 125 which support the first communication protocol and/or a second communication protocol. In some embodiments, the on-board computer 110 may operate in conjunction with the mobile device 112 to utilize the communication component 135a of the mobile device 112 and the link 122 to deliver information to the back-end components 104. In some embodiments, the on-board computer 110 may operate in conjunction with the mobile device 112 to utilize the communication component 135b of the vehicle 108 and the link 125 to deliver information to the back-end components 104. In some embodiments, both communication components 135a, 135b and their respective links 122, 125 may be utilized by the on-board computer 110 and/or the mobile device 112 to communicate with the back-end components 104.

Accordingly, either one or both of the mobile device 112 or on-board computer 110 may communicate with the network 120 over the links 122 and/or 125. Additionally, in some configurations, the mobile device 112 and on-board computer 110 may communicate with one another directly over a link 138, which may be a wireless or wired link.

In some embodiments of the system 100, the on-board computer 110 and/or the on-board mobile device 112 of the vehicle 108 may communicate with respective on-board computers and/or mobile devices disposed at one or more other vehicles 115a-115n, either directly or via the network 120. For example, the on-board computer 110 and/or the mobile device 112 disposed at the vehicle 108 may communicate with other vehicles' respective on-board computers and/or mobile devices via the network 120 and one or more of the communication components 135a, 135b by using one or more suitable wireless communication protocols (e.g., GSM, CDMA, LTE, one or more IEEE 802.11 Standards such as Wi-Fi, WiMAX, BLUETOOTH, etc.). In some configurations, the on-board computer 110 may communicate with a particular vehicle 115a-115n directly in a peer-to-peer (P2P) manner via one or more of the communication components 135a, 135b and the direct wireless communication link 140, which may utilize, for example, a Wi-Fi direct protocol, a BLUETOOTH or other short range communication protocol, an ad-hoc cellular communication protocol, or any other suitable wireless communication protocol.

In some embodiments, the system 100 may include one or more environmental communication components or devices, examples of which are depicted in FIG. 1A by references 142a, 142b, 142c, that are used for monitoring the status of one or more infrastructure components 145 and/or for receiving data generated by other sensors 150 that are associated with the vehicle 108 and disposed at locations that are off-board the vehicle 108. As generally referred to herein, with respect to the vehicle 108, "off-board sensors" or "environmental sensors" 150 are sensors that are not being transported by the vehicle 108. The data collected by the off-board sensors 150 is generally referred to herein as "sensor data," "off-board sensor data," or "environmental sensor data" with respect to the vehicle 108.

At least some of the off-board sensors 150 may be disposed on or at the one or more infrastructure components 145 or other types of components that are fixedly disposed within the environment in which the vehicle 108 is traveling. Infrastructure components 145 may include roadways, bridges, traffic signals, gates, switches, crossings, parking lots or garages, toll booths, docks, hangars, or other similar physical portions of a transportation system's infrastructure, for example. Other types of infrastructure components 145 at which off-board sensors 150 may be disposed may include a traffic light, a street sign, a railroad crossing signal, a construction notification sign, a roadside display configured to display messages, a billboard display, a parking garage monitoring device, etc. Off-board sensors 150 that are disposed on or near infrastructure components 145 may generate data relating to the presence and location of obstacles or of the infrastructure component 145 itself, weather conditions, traffic conditions, operating status of the infrastructure component 145, and/or behaviors of various vehicles 108, 115a-115n, pedestrians, and/or other moving objects within the vicinity of the infrastructure component 145, for example.

Additionally or alternatively, at least some of the off-board sensors 150 that are communicatively connected to the one or more infrastructure devices 145 may be disposed on or at one or more other vehicles 115a-115n operating in the vicinity of the vehicle 108. As such, a particular sensor that is disposed on-board another vehicle 115a may be viewed as an off-board sensor 150 with respect to the vehicle 108.

At any rate, the one or more environmental communication devices 142a-142c that are associated with the vehicle 108 may be communicatively connected (either directly or indirectly) to one or more off-board sensors 150, and thereby may receive information relating to the condition and/or location of the infrastructure components 145, of the environment surrounding the infrastructure components 145, and/or of other vehicles 115a-115n or objects within the environment of the vehicle 108. In some embodiments, the one or more environmental communication devices 142a-142c may receive information from the vehicle 108, while, in other embodiments, the environmental communication device(s) 142a-142c may only transmit information to the vehicle 108. As previously discussed, at least some of the environmental communication devices may be locally disposed in the environment in which the vehicle 108 is operating, e.g., as denoted by references 142a, 142b. In some embodiments, at least some of the environmental communication devices may be remotely disposed, e.g., at the back-end 104 of the system 100 as denoted by reference 142c. In some embodiments, at least a portion of the environmental communication devices may be included in (e.g., integral with) one or more off-board sensors 150, e.g., as denoted by reference 142b. In some configurations, at least some of the environmental communication devices 142 may be included or integrated into the one or more on-board communication components 135a, 135b, the on-board computer 110, and/or the mobile device 112 of surrounding vehicles 115a-115n (not shown).

In addition to receiving information from the on-board sensors 118 and off-board sensors 150 associated with the vehicle 108, the on-board computer 110 at the vehicle 108 may directly or indirectly control the operation of the vehicle 108 according to various fully- or semi-autonomous operation features. The autonomous operation features may include software applications or modules implemented by the on-board computer 110 to generate and implement control commands to control the steering, braking, or motive power of the vehicle 108. To facilitate such control, the on-board computer 110 may be communicatively connected to control components of the vehicle 108 by various electrical or electromechanical control components (not shown). When a control command is generated by the on-board computer 110, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

Further, the on-board computer 110 may control one or more operations of the vehicle 108 when the vehicle is operating non-autonomously. For example, the on-board computer 110 may automatically detect respective triggering conditions and automatically activate corresponding features such as traction control, windshield wipers, headlights, braking, etc.

FIG. 1B depicts a more detailed block diagram of the example back-end components 104 of the system 100. As shown in FIG. 1B, the remote computing system 130 included in the back-end components 104 may have a controller 151 that is operatively connected to the data storage device 132 via a link 152, which may be include a local and/or a remote link. It should be noted that, while not shown, additional data storage devices or entities may be linked to the controller 151 in a known manner. For example, separate, additional databases and/or data storage devices (not shown) may be used for various types of information, such as autonomous operation feature information, vehicle accidents, road conditions, vehicle insurance policy information, driver performance, or vehicle use information. Additional databases or data storage devices (not shown) may be communicatively connected to the remote computing system 130 via the network 120, such as databases maintained by third parties (e.g., weather databases, road construction databases, traffic congestion databases, road network databases, IoT (Internet-of-Things) or sensor databases implemented by a city or other jurisdiction, etc.).

The controller 151 may include one or more memories 160 (e.g., one or more program memories 160), one or more processors 162 (which may be called a microcontroller or a microprocessor), one or more random-access memories (RAMs) 164, and an input/output (I/O) circuit 166, all of which may be interconnected via an address/data bus 165. It should be appreciated that although only one microprocessor 162 is shown, the controller 151 may include multiple microprocessors 162. Similarly, the memory of the controller 151 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, optically readable memories, or biologically readable memories, for example. Generally speaking, the RAM 164 and/or the program memories 160 may respectively include one or more non-transitory, computer-readable storage media. The controller 151 may also be operatively connected to the network 120 via a link 170.

The remote computing system 130 may further include a number of applications 155a-155h stored in a program memory 160. In an embodiment, the applications 155a-155h comprise one or more software applications or sets of computer-executable instructions that are stored on the program memory 160 and executable by the processor 162. In an embodiment, at least some of the applications 155a-155h may be implemented at least partially in firmware and/or in hardware at the remote computing system 130.

The various applications 155a-155h on the remote computing system 130 may include, for example, a vehicle monitoring application 155a for receiving sensor data, whether from on-board sensors 118 and/or from off-board sensors 150, that is indicative of the operating behavior of the vehicle 108 and/or of its driver. The remote computing system 130 may also include an environmental monitoring application 155b for receiving data, whether from on-board sensors 118, off-board sensors 150, and/or third-party data feeds (not illustrated in FIG. 1A), that is indicative of environmental and contextual conditions in which the vehicle 108 is operating. Additionally, the remote computing system 130 may include a filtering application 155c for filtering a set of historical data based on a driving route and optionally other conditions, a weights generator application 155d for determining relative weightings of various conditions with respect to safety, a driver safety performance evaluation application 155e for determining a performance of the driver of the vehicle 108, and a real-time communication application 155f for communicating information and/or instructions to the vehicle 108 (e.g., to the on-board computing device 110, the mobile device 112, and/or another computing device disposed at the vehicle 108), to other vehicles 115a-115n, and/or to other computing systems. Other applications at the remote computing system 130 may include, for example, an application for supporting autonomous and/or semi-autonomous vehicle operations 155g and/or one or more other applications 155h which may support vehicle operations (whether fully-, semi- or non-autonomous) and other functions. Generally speaking, the applications 155a-155h may perform one or more functions related to evaluating driver safety performance. For example, one or more of the applications 155a-155h may perform at least a portion of any of the methods described herein.

The various modules or software applications 155a-155h may be executed on the same computer processor 162 or on different computer processors. Further, while the various applications 155a-155h are depicted as separate applications, two or more of the applications 155a-155h may be integrated as an integral application, if desired. In some embodiments, at least one of the applications 155a-155h may be implemented in conjunction with another application (not shown) that is stored and executed at the remote computing system 130, such as a navigation application.

The data storage device 132 is particularly configured to store various types of data related to and used for vehicle driver safety performance evaluation. For example, driver route data 175 may be stored at the data storage device 132. Driver route data 175 may include data that is indicative of the behavior of a driver and/or the behavior of the vehicle 108 while the vehicle 108 is being operated over a particular route, e.g., data that is sensed by on-board sensors 118 and/or by off-board sensors 150. Additionally, driver route data 175 may include data that is indicative of contextual or environmental conditions occurring while the vehicle 108 is being operated over the particular route, e.g., data that is provided by onboard sensors 118, off-board sensors 150, and/or third-party data feeds. Generally, each data point included in the driver route data 175 is time-stamped and includes an indication of a respective geo-location at which the data point was collected. That is, at least a portion of the driver route data 175 may include time-series data.

The data storage device 132 may also include historical driver data 178. Historical driver data 178 may include data that is indicative of driving behavior, vehicle operations, and environmental contexts in which multiple vehicles have traveled, e.g., along multiple routes and over multiple periods of time. For example, the historical driver data 178 may include respective driver route data 175 for a plurality of drivers of a plurality of vehicles over a plurality of routes and over a plurality of different periods of time. Each data point included in the historical driver data 178 may be associated with a respective timestamp an indication of a respective geo-location associated therewith, which may be indicative of the time in geo-location at which the data point was collected or obtained. That is, at least a portion of the historical driver data 178 may include time-series data.

In some embodiments, the data storage device 132 may include filtered data 180, which generally is a subset of the historical driver data 178. The historical driver data 178 may be filtered based on one or more conditions or parameters to generate the filtered data 180. For example, the filtered data 180 may be generated by filtering the historical driver data 178 based on a particular route, a time of day of travel, a particular weather condition, an amount of traffic congestion, whether the corresponding vehicle is an automobile or a truck, etc. Additionally or alternatively, the data storage device 132 may store a set of weights 182, which may correspond to various driving conditions and/or parameters. In an embodiment, the set of weights 182 may be included in a safe driver model 185, which may also be stored at the data storage device 182. Descriptions and usage of the filtered data 180, the set of weights 182, and the safe driver model 185 are described in later sections of this disclosure.

Additionally, it is noted that although the system 100 for determining driver performance 100 is shown in FIGS. 1A and 1B to include one vehicle 108, one mobile device 112, one on-board computer 110, and one remote computing system 130, it should be understood that different numbers of vehicles 108, mobile devices 112, on-board computers 110, and/or remote computing devices or servers 130 may be utilized. For example, the system 100 may include a plurality of servers 130 and hundreds or thousands of mobile devices 112 or on-board computers 110, all of which may be interconnected via the network 120. Furthermore, the database storage or processing performed by the one or more servers 130 may be distributed among a plurality of servers 130 in an arrangement known as "cloud computing." This configuration may provide various advantages, such as enabling near real-time uploads and downloads of information as well as periodic uploads and downloads of information. This may in turn support a thin-client embodiment of the mobile device 112 or on-board computer 110 discussed herein. Further, in some embodiments, any number of other vehicles 115a-115n may be communicatively connected to and/or included in the system 100, e.g., via the network 120.

Figure 2:
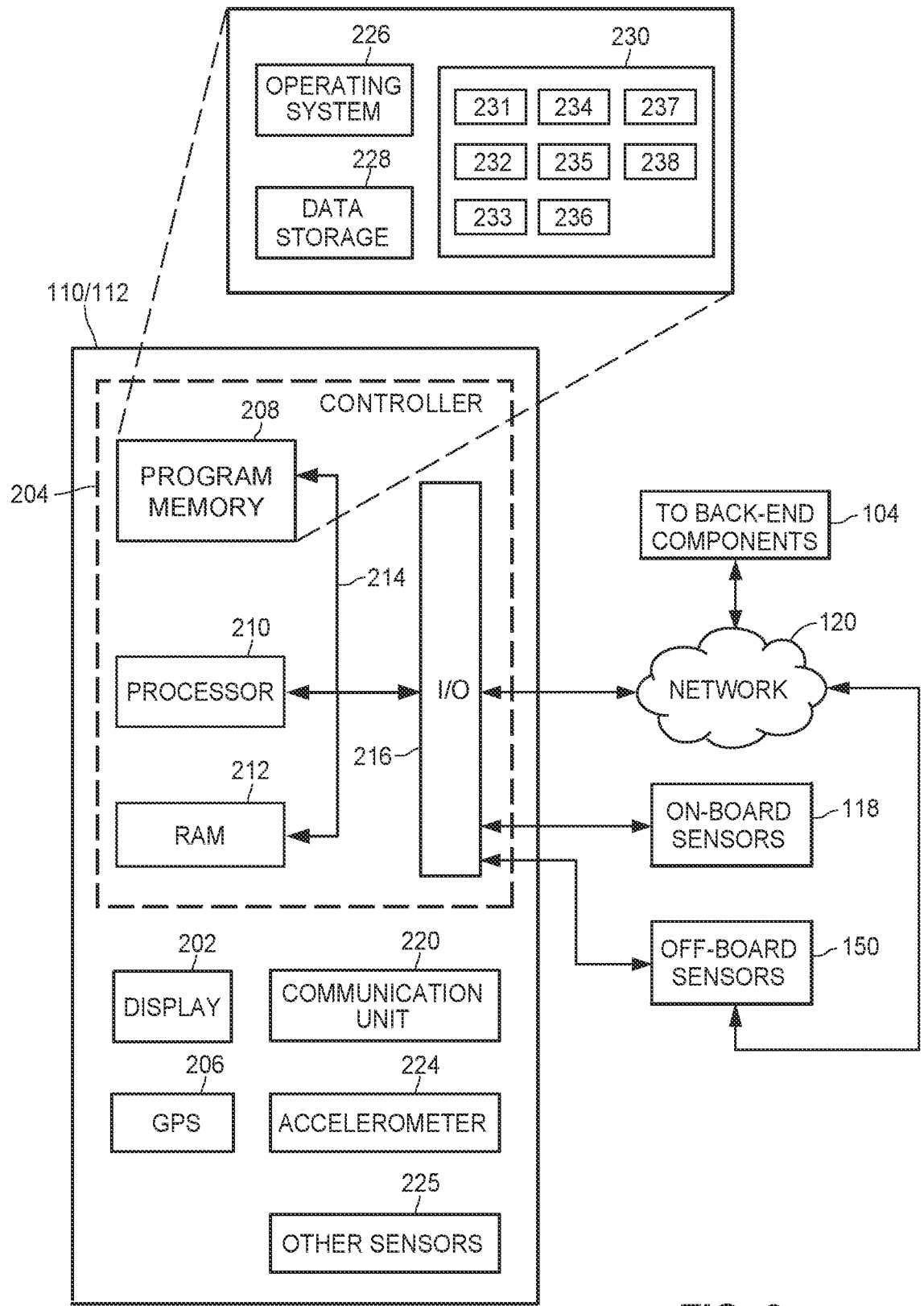
FIG. 2 illustrates a block diagram of an exemplary mobile device or on-board computer that may operate in conjunction with the system of FIGS. 1A and 1B.

FIG. 2 illustrates a block diagram of an exemplary mobile device 112 or an exemplary on-board computer 110 consistent with the system 100. The mobile device 112 or on-board computer 110 may include a display 202, a GPS or other suitable geo-location unit 206, a communication unit 220, an accelerometer 224, one or more additional sensors 225, a user-input device (not shown), and/or a controller 204, similar to the controller 151 in the remote computing system 130. In some embodiments, the mobile device 112 and on-board computer 110 may be integrated into a single device, or either may perform the functions of both. The on-board computer 110/mobile device 112 may interface with one or more on-board sensors 118 that are disposed at the vehicle 108 (but that are separate from the device 110/112) to receive information regarding the vehicle 108 and its environment. Additionally, the on-board computer 110/mobile device 112 may interface with one or more off-board sensors 150 to receive information regarding the vehicle 108 and its environment.

Similar to the controller 151, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, and/or a plurality of software applications 230. The operating system 226, for example, may include one of a plurality of general purpose or mobile platforms, such as the Android™ iOS®, or Windows® systems, developed by Google Inc., Apple Inc., and Microsoft Corporation, respectively. Alternatively, the operating system 226 may be a custom operating system designed for the on-board computer 110. The data storage 228 may include data such as user profiles and preferences, application data for the plurality of applications 230, and other data related to evaluating driver performance. In some embodiments, the controller 204 may also include, or otherwise be communicatively connected to, other data storage mechanisms (e.g., one or more hard disk drives, optical storage drives, solid state storage devices, etc.) that reside within the vehicle 108 and/or at the remote system 130.

As discussed with reference to the controller 151, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example. Generally speaking, the RAMs 212 and/or the program memories 208 may respectively include one or more non-transitory, computer-readable storage media.

The one or more processors 210 of the device 110/112 may be adapted and configured to execute any of one or more of the plurality of software applications 230 residing in the program memory 204, in addition to other software applications. The various software applications 230 of the device 110/112 may include, for example, a vehicle monitoring application 231 for receiving (whether from on-board sensors 118 and/or from off-board sensors 150) sensor data indicative of the operating behavior of the vehicle 108 and/or of the driver, an environmental monitoring application 232 for receiving (whether from on-board sensors 118, off-board sensors 150, and/or third-party data feeds) data indicative of environmental and contextual conditions in which the vehicle 108 is operating, a filtering application 233 for filtering a set of historical data based on a driving route and optionally other conditions, a weights generator application 234 for determining relative weightings of various conditions with respect to safety, a driver safety performance evaluation application 235 for determining a performance of the driver of the vehicle 108, and a real-time communication application 236 for communicating information and/or instructions to the vehicle 108 (e.g., to another computing device or system disposed at the vehicle 108), to other vehicles 115a-115n, to the remote computing system 130, to other back-end components 104 of the system 100 such as the environmental communication device 142c, and/or to other computing systems. Other applications that are executed at the device 110/112 may include, for example, an application for supporting autonomous and/or semi-autonomous vehicle operations 237 and/or one or more other applications 238 which may support vehicle operations (whether fully-, semi-, or non-autonomous). Generally speaking, the applications 230 may perform one or more functions related to evaluating driver safety performance. For example, one or more of the applications 230 may perform at least a portion of any of the methods described herein. In some embodiments, one or more of the applications 230 may operate in conjunction with one or more of the applications 155a-155h at the remote computing system 130 to perform one or more functions related to evaluating driver safety performance. For example, one or more of the applications 231-238 at the device 110/112 may be implemented as a thin-client that operates in conjunction with one or more of the applications 231-238 at the remote computing system.

The various software applications 230 may be executed on the same computer processor 210 or on different computer processors. Further, while the various applications 231-238 are depicted as separate applications, two or more of the applications 231-238 may be integrated as an integral application, if desired. In some embodiments, at least one of the applications 231-238 may be implemented in conjunction with another application (not shown) that is stored and executed at the device 110/112, e.g., a navigation application, a user interface application, etc.

In addition to the communicative connections to the on-board sensors 118 that are disposed at the vehicle 108 but not at, on, or within the device 110/112 itself, the device 110/112 may include additional on-board sensors 118 that are integral with the device 110/112, such as the GPS unit 206 and/or the accelerometer 224, which may provide information regarding the operation of the vehicle 108. Such integral sensors 118 may further include one or more sensors of a sensor array 225, which may include, for example, one or more cameras, additional accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, direction, and/or other parameters associated with movements of the vehicle 108.

Furthermore, the communication unit 220 of the device 110/112 may communicate with other vehicles 115a-115n, infrastructure or environmental components 142, 145, back-end components 104, or other external sources of information to transmit and receive information relating to evaluating driver performance. For example, the communication unit 220 may be included in or may include one or more of the communication components 135a, 135b shown in FIG. 1A. Additionally or alternatively, the communication unit 220 may be included in or may include an instance of the environmental communication component 142 shown in FIG. 1A. The communication unit 220 may communicate with the external sources via the network 120 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Further, the communication unit 220 may provide input signals to the controller 204 via the I/O circuit 216. The communication unit 220 may also transmit sensor data, device status information, control signals, or other output from the controller 204 to one or more sensors 118 within the vehicle 108, mobile devices 112, on-board computers 110, off-board sensors 150, environmental communication devices 142, and/or remote servers 130.

Further, the mobile device 112 or the on-board computer 110 may include a user-input device (not shown) for receiving instructions or information from the vehicle operator, such as settings, selections, acknowledgements, etc. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Figure 3:
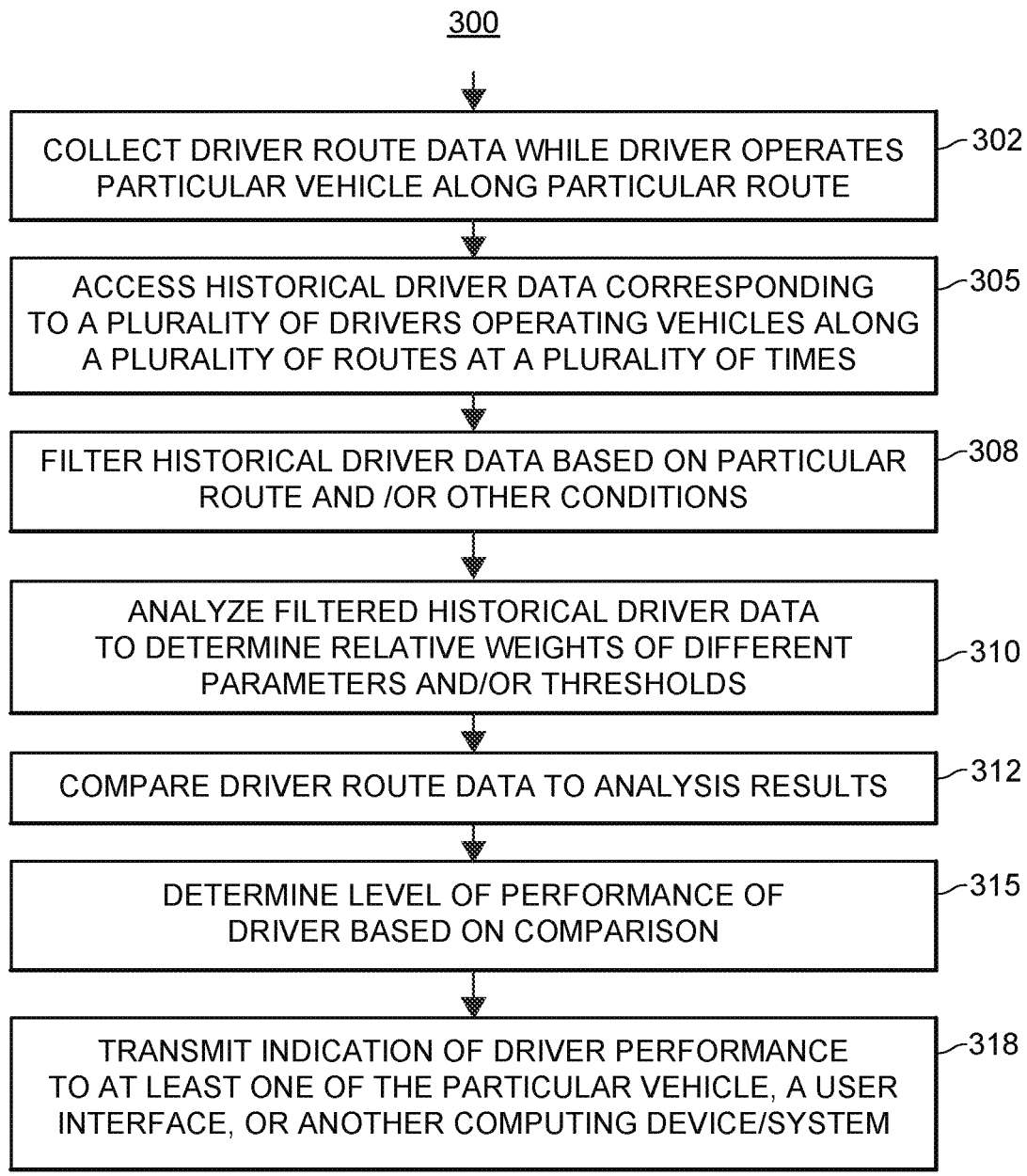
FIG. 3 illustrates a flow diagram of an exemplary method for determining vehicle driver's performance.

FIG. 3 depicts a flow diagram of an exemplary method 300 for determining the safety performance of a driver of a vehicle, such as the vehicle 108 of FIG. 1A. At least a portion of the method 300 may be performed by the system 100 of FIGS. 1A and 1B, for example, by the on-board computer 110, the on-board mobile device 112, and/or the remote computing devices 130. For ease of discussion, and not for limitation purposes, the method 300 is discussed with simultaneous reference to the system 100, although it is understood that the method 300 may operate in conjunction with other systems and/or computing devices.

At a block 302, the method 300 may include collecting driver route data (e.g., driver route data 175) that is associated with a vehicle, such as the vehicle 108. Generally speaking, the driver route data 175 may include data that is indicative of a behavior of the vehicle 108, a behavior of the driver of the vehicle 108, and/or various contextual and environmental conditions occurring while the vehicle is operated along a particular route over a particular time period or interval. The driver route data 175 may include data collected from one or more sensors that are disposed on-board the vehicle 108 (e.g., the on-board sensors 118), data collected from one or more sensors that are disposed off-board the vehicle 108 (e.g., the off-board sensors 150), and/or third-party generated data that is indicative of environmental and/or contextual conditions occurring along the particular route during the particular time period or interval. Third-party data may include, for example, data that is stored in databases maintained by third parties, e.g., weather databases, road construction databases, traffic congestion databases, road network databases, IoT or sensor databases implemented by a city or other jurisdiction, etc., and that is provided via a data feed to the system 100, e.g., via the network 120. Some or all of the data points included in the driver route data 175 may include respective indications of a time and a geo-location at which the data point was collected or observed. That is, at least some of the driver route data 175 may be time-series data.

The driver route data 175 may include data that is indicative of a vehicle's position, speed, acceleration, direction, movement, and/or responsiveness to controls. Additionally or alternatively, the driver route data 175 collected at the block 302 may include data that is indicative of users and/or human presence within the vehicle 108, such as data indicative of in-cabin temperatures, in-cabin noise levels, data from seat sensors (e.g., indicative of whether or not a person is using a seat, and thus the number of passengers being transported by the vehicle 108), data from seat belt sensors, data regarding the operations of user controlled devices such as windshield wipers, defrosters, traction control, mirror adjustment, interactions with on-board user interfaces, etc. In some embodiments, the driver route data 175 may include data that is indicative of various contextual or environmental conditions of the particular route during the particular time interval, e.g., weather changes and/or conditions, road conditions, road configurations (e.g., merging lanes, construction zones, etc.), traffic density, pedestrian density, density of other humans (e.g., cyclists, skateboarders, etc.), posted speed limits and other traffic signs/lights, school zones, railroad tracks, traffic accidents, etc.

At a block 305, the method 300 may include accessing historical driver data 178 that includes data indicative of driving behavior, vehicle operations and behavior, and/or environmental conditions and contexts obtained for multiple drivers of multiple vehicles along multiple routes and over multiple periods or intervals of time. The historical driver data 178 may be stored at and accessed from the data storage device 132, for example, e.g., by utilizing any suitable local access mechanism (e.g., a function call, a database read, an API (Application Programming Interface), etc.) and/or any suitable remote access mechanism (e.g., a message exchange using a communication protocol, a remote API, etc.). In an embodiment, the historical driver data 178 may include respective driver route data 175 corresponding to a plurality of drivers of a plurality of vehicles over a plurality of routes and over a plurality of different periods of time or different time intervals. At least some of the historical driver data 178 may have been generated by and/or collected from multiple sets of sensors associated with multiple vehicles 108, 115a-115n (e.g., on-board sensors 118, off-board sensors 150, etc.). At least some of the historical driver data 178 may include third-party data that may have been generated and provided by one or more third-party data providers. Typically, third-party data includes data that is indicative of one or more environmental or contextual conditions occurring along various routes in various intervals of time. Third-party data may include, for example, data from weather databases, road construction databases, traffic congestion databases, road network databases, IoT or sensor databases implemented by a city or other jurisdiction, etc. Third-party data may be stored in databases maintained by third-parties (e.g., a party or entity other than that providing the system 100), and the third-party data may be provided to the system 100, e.g., as a data feed via the network 120. In an embodiment, each data point included in the historical driver data 178, whether sensed or obtain via third party, may have a respective timestamp and indication of a respective geo-location associated therewith, which may be indicative of the time and geo-location at which the respective data point was collected or obtained. As such, at least a portion of the historical driver data 178 may be time-series data.

At a block 308, the method 300 may include filtering the historical driver data 178 based on at least a portion of the information included in the driver route data 175 to obtain a subset 180 of the historical driver data 178 that corresponds to the driver route data 175. In an embodiment, the historical driver data 178 may be filtered based on the particular route identified in the driver route data 175. Additionally or alternatively, the historical driver data 178 may be filtered based on one or more other conditions or parameters indicated in the driver route data 175, such as particular weather conditions, time of day, type of vehicle, and/or any other one or more conditions or parameters. The filtered subset 180 of the historical driver data 178 may be stored at the data storage device 132, and/or may be stored at a local memory of the controller 151, if desired.

At a block 310, the method 300 may include analyzing the filtered data 180 corresponding to the driver route data 175 to determine respective weights or weightings 182 of one or more parameters included therein. The parameters may be indicative of, for example, a behavior of the particular driver while operating the vehicle 108 over the particular route, a behavior of the vehicle 108 while being operated by the particular driver along the particular route, or an environmental condition of the particular route while the vehicle traversed the particular route. For example, various parameters may correspond to various types of sensors, various types of sensed data, and/or various environmental or contextual conditions, which may include dynamic and static conditions occurring along the particular route.

A respective weighting of a particular parameter may be indicative of a relative contribution of the particular parameter towards safer driving behavior. For example, the weighting of a parameter indicative of whether or not ice is present on the particular route may be greater than the weighting of a parameter indicative of the speed limit along the particular route, thus indicating that the presence of ice has a greater effect on driving safety than the speed limit. In some implementations, a respective weighting may additionally or alternatively be indicative of a conditionality of the relative contribution of the particular parameter towards driving safety based on other parameters and/or values thereof. For example, a parameter indicative of radio volume may have a greater contribution to driving safety when the particular route is congested (as indicated by the value of another parameter) and/or is being utilized by numerous pedestrians (as indicated by the value of still another parameter), whereas the parameter indicative of radio volume may have a lesser contribution to driving safety when the particular route is devoid of other traffic and/or pedestrians.

In an embodiment, the analysis of the filtered historical driver data 180 at the block 310 may include performing one or more statistical or learning analyses or techniques on the filtered data 180. For example, a regression analysis, a cluster analysis, a classification analysis, and/or one or more other types of statistical and/or learning analyses may be performed on the filtered data 180. A result or output of the application of the statistical and/or learning techniques to the filtered data 180 may include the relative weights or weightings 182 of one or more parameters included in the filtered data 180. In an exemplary but non-limiting implementation, the one or more statistical analyses and/or learning techniques may be applied to the filtered data 180 to generate or create a safe driver model 185, which may be, for example, a statistical model. The safe driver model 185 may indicate or define the various weights or weightings 182 of various parameters included in the filtered historical driver data 180. As such, the analysis or analyses of the filtered data 180 at the block 310 may create a baseline set of safe driving behaviors for the particular route based on statistical analyses/learning techniques applied to a multiplicity of driver route data 175 for similar environmental and contextual conditions along the particular route. Further, at the block 310, the analysis or analyses of the filtered data 180 may determine different thresholds of various parameter values that correspond to different levels of driving safety. Still further, in some embodiments, different sets of weights 182 and/or different models 185 may be generated for different portions of the route and/or based on one or more other parameters. For example, different models 185 may be respectively generated for rush-hour and non-rush-hour time periods, and/or different models 185 may be respectively generated for cars and trucks. The generated set(s) of weights 182 and/or the generated model(s) 185 may be stored at the data storage device 132 and/or locally in a memory of the controller 151.

Other techniques may be additionally or alternatively utilized to analyze the filtered historical driver data 180. For example, the block 310 may access a list of prioritizations amongst various parameters (which may or may not include conditional prioritizations), and may filter or otherwise utilize the list based on the parameters and/or their respective values included in the filtered historical driver data 180 to determine the relative weights or weightings 182 amongst parameters that are represented therein. Generally speaking, though, the block 310 may utilize any desired technique or techniques to determine the relative weights or weightings 182 amongst the plurality of parameters included in the filtered historical driver data 180, and the relative weights or weightings 182 may be stored, e.g., at the data storage device 132 and/or locally in a memory of the controller 151.

At a block 312, the method 300 may include comparing the driver route data 175 to the results of the analysis performed at the block 310. In an embodiment, values of parameters included in the driver route data 175 may be compared in view of the relative weightings 182 of the parameters as determined at the block 310. At a block 315, the method 300 may include determining a level of safety performance of the driver, e.g., for the particular route over the particular interval of time, based on the comparison performed at the block 312. As such, based on the values of the parameters included in the driver route data 175 and the relative weightings 182 of various parameters and their respective impacts on driving safety, a safety performance level or score may be determined for the driver of the vehicle 108, e.g., over the particular route in particular interval of time.

In an embodiment of the method 300 in which a safe driver model 185 is generated, the blocks 312 and 315 may be executed by utilizing the safe driver model 185. For example, one or more parameter values included in the driver route data 175 may be input into or provided to the model 185. That is, the safe driver model 185 may be applied to one or more parameter values included in the driver route data 175. Subsequently, based on the application of the model 185 to the one or more parameter values included in the driver route data 175, the safe driver model 185 may generate an indication of the level of performance of the driver, which may be based on the set of weights 182 defined by or included in the model 185. That is, an output provided by the safe driver model 185 may be indicative of a level of safety (e.g., a safety score) of the driver while he or she was operating the vehicle 108 over the particular route during the particular time interval.

At a block 318, the method 300 may include transmitting or providing an indication of or corresponding to the determined level of driver performance to at least one of the vehicle 108, a user interface, or another computing device or system. The transmitted indication may be, for example, an alert, warning, or notification to the driver of the vehicle 108 and/or to drivers of vehicles 115a-115n that are operating in the vicinity of the vehicle 108. An indication of the alert, warning, or notification may be presented on a user interface disposed at the receiving vehicle 108, 115a-115n, e.g., at an on-board user interface of the receiving vehicle, and/or at a user interface of an on-board mobile device 112. The indication may include one or more suggested actions that may be performed at the receiving vehicle to mitigate effects of the determined driver performance, in some scenarios.

In some embodiments, the transmitted indication corresponding to the determined level of driver performance may include an instruction that is to be executed by a computing device on-board the receiving vehicle 108, 115a-115n to automatically modify an operation of the receiving vehicle 108, 115a-115n. For example, if the receiving vehicle is operating in a fully or partially autonomous mode, and/or if a driver of the receiving vehicle has indicated that or given permission for at least certain modifications to vehicle operations may be automatically performed, the transmitted indication may automatically cause a change or modification in one or more operating behaviors of the receiving vehicle 108, 112a-112n, such as a decrease in rate of speed, a change in steering, etc.

In some embodiments, the transmitted indication corresponding to the determined level of driver performance may be received by another computing system that is not disposed at any vehicle. For example, the transmitted indication may be received by a computing system that automatically controls aspects of the infrastructure, e.g., by changing stop light colors at an intersection, providing dynamic warnings displayed on highway signs, etc., and such a computing system may send one or more commands to control the behavior of various infrastructure components (e.g., lights, warning signals, etc.) based on the contents of the transmitted indication.

In some embodiments, the transmitted indication may be provided to another computing system for processing. For example, the transmitted indication of the driver's performance may be transmitted to a computing system of an insurance company, and the determined driver's performance may be utilized to determine and/or modify an amount of risk associated with the driver, which may in turn be utilized to determine an amount of an insurance premium, the amount of a deductible, and/or the creation and/or modification of these and/or other financial terms associated with obtaining or maintaining an insurance policy for the driver and/or for the vehicle 108.

In an embodiment, at least a portion (and in some cases, all) of the method 300 may be executed in real-time. That is, while a driver is traversing a particular route, the method 300 may determine the driver's on-going, current, or real-time performance while operating the vehicle on that particular route and provide suggestions to the driver (e.g., via a user interface disposed at the vehicle) for one or more driving modifications while he or she is operating the vehicle over the particular route (e.g., slow down to a certain speed, turn on your headlights, etc.). Additionally or alternatively, based on the driver's on-going or real-time performance, the method 300 may provide one or more instructions to the vehicle to automatically modify an operating behavior of the vehicle while the driver is operating the vehicle over the particular route. For example, if the driver has opted-in, given permission for, or otherwise assented to various automatic vehicle operations, based on the determination of the driver's performance, the method 300 may include instructing the vehicle to automatically change some aspect of its operation while traversing the particular route, e.g., automatically turn on traction control, automatically turn down the radio volume, etc.

In some embodiments (not shown), the method 300 may include updating the historical driver data (e.g., by adding the obtained driver route data of the block 302 and/or other driver route data), and subsequently analyzing the updated historical driver data (e.g., at the block 310) to determine updated weightings of parameters and/or updated thresholds. The updated weights of the parameters and/or the updated thresholds may be utilized to assess the subject driver's safety performance, for example. In some embodiments, updating the historical driver data, updating the weightings of the parameters and/or thresholds, and determining the subject driver's current safety performance accordingly may be done in real-time or near-real-time. For example, while the driver is operating the vehicle 108 over the particular route, an initial assessment or evaluation of the driver's safety performance may be determined by the method 300 for a first portion of the particular route. Subsequently, the weights of the parameters and/or the thresholds may be updated by the method 300 based on newly obtained historical driver data while the driver continues to operate the vehicle over the particular route, and an updated assessment/evaluation of the driver's safety performance for a second portion of the particular route may be determined by the method 300 based on the updated parameter weights and/or thresholds. As such, the weights of the parameters and/or thresholds may be dynamically adjusted, e.g., in an up-to-the-minute manner or in real-time based on driver data of one or more other drivers that is obtained in real-time. For example, the safe-driver model 185 may be dynamically updated or adjusted in real-time. As such, the subject driver's safety performance may be assessed in real-time using the dynamically adjusted weights, thresholds, and/or model. Thus, a more timely, granulated, and accurate assessment of the driver's safety performance is able to be provided by the method 300 as compared with known techniques.

Figure 4:
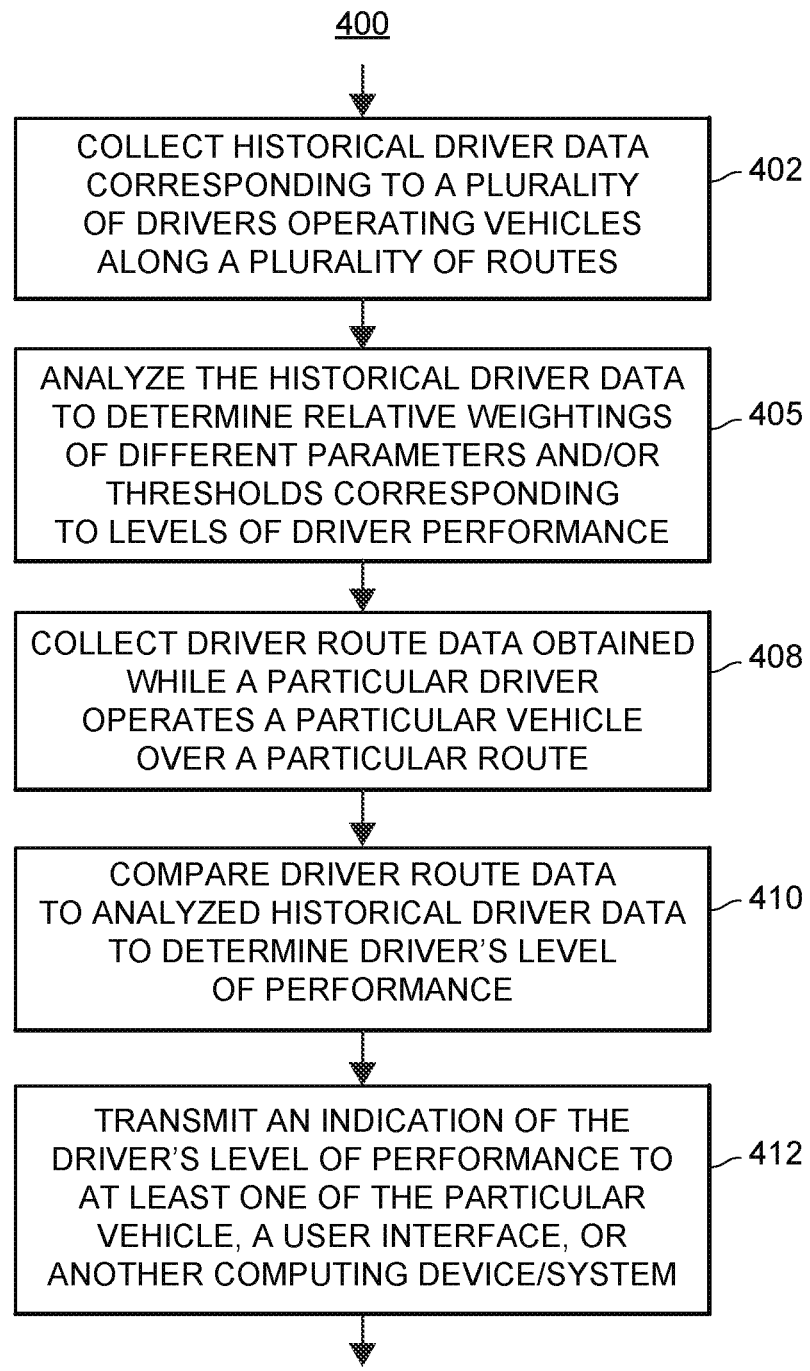
FIG. 4 illustrates a flow diagram of an exemplary method for determining vehicle driver's performance.

FIG. 4 depicts a flow diagram of an exemplary method 400 for determining a vehicle driver's performance. At least a portion of the method 400 may be performed by the system 100, for example, by the on-board computer 110, the on-board mobile device 112, and/or the remote computing system 130. In some embodiments, at least a portion of the method 400 may be performed in conjunction with one or more portions of the method 300. For ease of discussion, and not for limitation purposes, the method 400 is discussed with simultaneous reference to the system 100, although it is understood that the method 400 may operate in conjunction with other systems and/or computing devices.

At a block 402, the method 400 may include collecting historical driver data 178 that includes data indicative of driving behavior, vehicle operations and behavior, and/or environmental conditions and contexts. The historical driver data 178 may have obtained for multiple drivers of multiple vehicles along multiple routes and over multiple periods of time, for example. In an embodiment, the historical driver data 178 may include respective driver route data 175 of a plurality of drivers of a plurality of vehicles, over a plurality of routes and over a plurality of different periods of time or different time intervals. At least some of the historical driver data 178 may have been generated by and/or collected from multiple sets of sensors associated with the vehicles 108, 115a-115n (e.g., on-board sensors 118, off-board sensors 150, etc.). At least some of the historical driver data 178 may include third-party data which may have been generated and provided by one or more third-party data providers. Typically, third-party data includes data that is indicative of one or more environmental or contextual conditions occurring along various routes over various intervals of time. Third-party data may include, for example, data from weather databases, road construction databases, traffic congestion databases, road network databases, IoT (Internet-of-Things) or sensor databases implemented by a city or other jurisdiction, etc. Third-party data may be stored in databases maintained by third parties (e.g., a party or entity other than that providing the system 100), and the third-party data may be provided to the system 100, e.g., as a data feed via the network 120. In an embodiment, each data point included in the historical driver data 178, whether sensed or obtained via a third-party, may have a respective timestamp and indication of a geo-location associated therewith, which may be indicative of the time and geo-location at which the respective data point was collected or obtained. As such, at least a portion of the historical driver data 178 may be time-series data. The collected historical driver data 178 may be stored in the data storage device 132, for example.

At a block 405, the method 400 may include analyzing the historical driver data 178 to determine respective weights or weightings 182 of one or more parameters included therein. The parameters may be indicative of, for example, behaviors of drivers while operating vehicles over various routes at various times, behaviors of vehicles will being operated by drivers along the various routes at various times, or environmental or contextual conditions occurring over the various routes at the various times. For example, various parameters may correspond to data collected by various types of sensors, various types of sensed data, and/or various environmental or contextual conditions, which may include both static and dynamically occurring conditions.

A respective weight or weighting of a particular parameter may be indicative of a relative contribution of the particular parameter towards safer driving behavior. For example, the weighting of a parameter indicative of whether or not ice is present on the particular route may be greater than the weighting of a parameter indicative of the speed limit along the particular route, thus indicating that the presence of ice has a greater effect on driving safety than the speed limit. In some implementations, a respective weighting may additionally or alternatively be indicative of a conditionality of the relative contribution of the particular parameter towards driving safety based on other parameters and/or values thereof. For example, a parameter indicative of radio volume may have a greater contribution to driving safety (and therefore a greater weight value) when the particular route is congested (as indicated by the value of another parameter) and/or is being utilized by numerous pedestrians (as indicated by the value of still another parameter), whereas the parameter indicative of radio volume may have a lesser contribution to driving safety (and therefore a lesser weight value) when the particular route is devoid of other traffic and/or pedestrians.

In an embodiment, analyzing the historical driver data 178 at the block 405 may include performing one or more statistical or learning analyses or techniques on the historical driver data 178. For example, a regression analysis, a cluster analysis, a classification analysis, and/or one or more other types of statistical and/or learning analyses may be performed on the historical driver data 178. A result or output of the application of the statistical and/or learning techniques to the historical driver data 178 may include the relative weights or weightings 182 of one or more parameters included in the historical driver data 178. In an exemplary but non-limiting implementation, the one or more statistical analyses and/or learning techniques may be applied to the historical driver data 178 to generate or create a safe driver model 185, which may be, for example, a statistical model. The safe driver model 185 may indicate or define the various weights or weightings 182 of various parameters included in the historical driver data 178. As such, the analysis or analyses of the historical driver data 170 at the block 405 may create a baseline set of safe driving behaviors for a particular route based on statistical analyses/learning techniques applied to a multiplicity of driver route data 175 for similar environmental and contextual conditions along the particular route. Further, at the block 405, the analysis or analyses of the historical driver data 178 may determine different thresholds of various parameter values that correspond to different levels of driving safety. Still further, in some embodiments, different sets of weights 182 and/or different models 185 may be generated for different routes or portions thereof. The generated set(s) of weights 182 and/or the generated model(s) 185 may be stored at the data storage device 132 and/or locally in a memory of the controller 151.

Other techniques may be additionally or alternatively utilized to analyze the historical driver data 178. For example, the block 405 may access a list of prioritizations amongst various parameters (which may or may not include conditional prioritizations), and may filter or otherwise utilize the list based on the parameters and/or their respective values included in the historical driver data 178 to determine the relative weights or weightings 182 amongst parameters that are represented therein.

Generally speaking, though, the analysis or analyses performed at block 405 may utilize any desired technique or techniques to determine the relative weights or weightings 182 amongst the plurality of parameters included in the historical driver data 178. The analysis or analyses performed at the block 405 may be positively or negatively oriented, as desired. For example, the analyses performed at the block 405 may determine particular parameter values and/or combinations thereof indicative of safe driving behavior (and optionally, thresholds corresponding to different levels of safe driving behavior), and/or the analyses may determine particular parameter values and/or combinations thereof that are indicative of unsafe driving behavior (and optionally, thresholds corresponding to different levels of unsafe driving behavior). In some embodiments, different sets of weights 182 may be generated for different routes or portions thereof. In some embodiments, different sets of weights 182 may be generated for different environmental conditions. For example, different sets of weights 182 may be generated for rush hour and for non-rush hour traffic, and/or different sets of weights 182 may be generated for different road conditions. The generated set(s) of weights or weightings 182 may be stored, e.g., at the data storage device 132 and/or locally in a memory of the controller 151.

At a block 408, the method 400 may include collecting driver route data (e.g., driver route data 175) that is associated with a vehicle (e.g., the vehicle 108) for a particular route over a particular interval of time. Generally speaking, the driver route data 175 may include data that is indicative of a behavior of the vehicle 108, a behavior of the driver of the vehicle 108, and/or various contextual and environmental conditions occurring while the vehicle is operated or is operating along the particular route over the particular time interval. The driver route data 175 may include data collected from one or more sensors that are disposed on-board the vehicle 108 (e.g., the on-board sensors 118), data collected from one or more sensors that are disposed off-board the vehicle 108 (e.g., the off-board sensors 150), and/or third-party generated data that is indicative of environmental and/or contextual conditions occurring along the particular route during the particular time period or interval. Third-party data may include, for example, data that is stored in databases maintained by third parties, e.g., weather databases, road construction databases, traffic congestion databases, road network databases, IoT (Internet-of-Things) or sensor databases implemented by a city or other jurisdiction, etc., and that is provided via a data feed to the system 100, e.g., via the network 120. Some or all of the data points included in the driver route data 175 may include respective indications of a time and a geo-location at which the data point was collected or observed. That is, at least some of the driver route data 175 may be time-series data.

At a block 410, the method 300 may include comparing the driver route data 175 collected at the block 408 to the results of the analysis of the historical driver data 178 performed at the block 405 to determine the driver's level of performance for the particular route over the particular time interval. In an embodiment, values of one or more parameters included in the driver route data 175 may be compared in view of relative weightings 182 of the parameters as determined at the block 405. The block 410 may include determining a level of safety performance of the driver, e.g., for the particular route over the particular interval of time. As such, based on the values of the parameters included in the driver route data 175 and the relative weightings 182 of various parameters and their respective impacts on driving safety, a safety performance level or score may be determined for the driver of the vehicle 108, e.g., over the particular route in particular interval of time.

In an embodiment of the method 400 in which a safe driver model 185 is generated, the block 410 may be executed by utilizing the safe driver model 185. For example, one or more parameter values included in the driver route data 175 may be input into or provided to the model 185. That is, the safe driver model 185 may be applied to one or more parameter values included in the driver route data 175. Subsequently, based on the application of the model 185 to the one or more parameter values included in the driver route data 175, the safe driver model 185 may generate an indication of the level of performance of the driver, which may be based on the set of weights 182 defined by or included in the model 185. That is, an output provided by the safe driver model 185 may be indicative of a level of safety (e.g., a safety score) of the driver while he or she was operating the vehicle 108 over the particular route during the particular time interval.

At a block 412, the method 400 may include transmitting or providing an indication of or corresponding to the determined level of driver performance to at least one of the vehicle 108, a user interface, or another computing device or system. The transmitted indication may be, for example, an alert, warning, or notification to the driver of the vehicle 108, to drivers of nearby vehicles 115a-115n, and/or to autonomous vehicles 115a-115n that are operating in the vicinity of the vehicle 108. An indication of the alert, warning, or notification may be presented on a user interface disposed at the receiving vehicle 108, 115a-115n, e.g., at an on-board user interface of the receiving vehicle, and/or at a user interface of an on-board mobile device 112. The indication may include one or more suggested actions that may be performed at the receiving vehicle to mitigate effects of the determined driver performance, in some scenarios.

In some embodiments, the transmitted indication corresponding to the determined level of driver performance may include an instruction that is to be executed by a computing device on-board the receiving vehicle 108, 115a-115n to automatically modify an operation of the receiving vehicle 108, 115a-115n. For example, if the receiving vehicle is operating in a fully or partially autonomous mode, and/or if a driver of the receiving vehicle has indicated that at least certain modifications to vehicle operations may be automatically performed, the transmitted indication may automatically cause a change or modification in one or more operating behaviors of the receiving vehicle 108, 115a-115n, such as a decrease in rate of speed, a change in steering, etc.

In some embodiments, the transmitted indication corresponding to the determined level of driver performance may be received by another computing system that is not disposed at any vehicle. For example, the transmitted indication may be received by a computing system that automatically controls aspects of the infrastructure, e.g., by changing stop light colors at an intersection, providing dynamic warnings displayed on highway signs, etc., and such a computing system may send one or more commands to control the behavior of various infrastructure components (e.g., lights, warning signals, etc.) based on the contents of the transmitted indication.

In some embodiments, the transmitted indication may be provided to another computing system for processing and/or use in other applications. For example, the transmitted indication of the driver's performance may be transmitted to a computing system of an insurance company, and the determined driver's performance may be utilized to determine and/or modify an amount of risk associated with the driver, which may in turn be utilized to determine an amount of an insurance premium, the amount of a deductible, and/or the creation and/or modification of these and/or other financial terms associated with obtaining or maintaining an insurance policy for the driver and/or for the vehicle 108.

It is noted that in some embodiments, some or all of the method 400 may be executed in real-time. That is, while a driver is traversing a particular route, the method 400 may execute to determine the driver's on-going, current, or real-time performance on that particular route and provide suggestions to the driver (e.g., via a user interface disposed at the vehicle) for one or more driving modifications while he or she is operating the vehicle over the particular route (e.g., slow down to a certain speed, turn on your headlights, etc.). Additionally or alternatively, based on the driver's on-going or real-time performance, the method 400 may execute to provide one or more instructions to the vehicle while the driver is operating the vehicle over the particular route. For example, if the driver has opted-in, given permission for, or assented to various automatic vehicle operations, based on the determination of the driver's performance, the method 400 may include instructing the vehicle to automatically change some aspect of its operation while traversing the particular route, e.g., automatically turn on traction control, automatically turn down the radio volume, etc.

In some embodiments (not shown), the method 400 may include updating the historical driver data (e.g., by adding the obtained driver route data of the block 408 and/or other driver route data), and subsequently analyzing the updated historical driver data (e.g., at the block 405) to determine updated weightings of parameters and/or updated thresholds. The updated weights of the parameters and/or the updated thresholds may be utilized to assess the subject driver's safety performance and/or other drivers' respective safety performances, for example. In some embodiments, updating the historical driver data, updating the weightings of the parameters and/or thresholds, and determining a driver's current safety performance accordingly may be done in real-time or near-real-time. For example, while the driver is operating the vehicle 108 over a particular route, an initial assessment or evaluation of the driver's safety performance may be determined by the method 400 for a first portion of the particular route. Subsequently, the weights of the parameters and/or the thresholds may be updated by the method 400 based on newly obtained historical driver data while the driver continues to operate the vehicle over the particular route, and an updated assessment/evaluation of the driver's safety performance for a second portion of the particular route may be determined by the method 400 based on the updated parameter weights and/or thresholds. In this manner, the weights of the parameters and/or thresholds may be dynamically adjusted, e.g., in an up-to-the-minute or real-time manner based on driver data of one or more other drivers that is obtained in real-time. For example, the safe-driver model 185 may be dynamically updated or adjusted in real-time. Accordingly, the subject driver's safety performance and other drivers' safety performances may be assessed in real-time using the dynamically adjusted weights, thresholds, and/or model. Thus, a more timely, granulated, and accurate assessment of the drivers' safety performances is able to be provided by the method 400 as compared with known techniques for assessing driver performance.

In some aspects of the systems, methods, and techniques described herein, the driver may opt-in to a rewards, loyalty, discount, or other program. For example, the driver may allow the remote computing system 130 to collect sensor, telematics, vehicle, mobile device, driver performance, and other types of data discussed herein. With customer permission or affirmative consent, the data collected may be analyzed (whether by the remote computing system 130 or by another computing system that is communicatively connected to the remote computing system 130) to provide certain benefits to the driver. For instance, insurance cost savings may be provided to the driver based on his or her contextual driving performance. Recommendations that lower risk or provide cost savings to the driver may also be generated and provided to customers based upon data analysis.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A system for determining driver performance, the system comprising:
    a processor; and
    memory in communication with the processor, the memory storing instructions that, when executed by the processor, cause the processor to perform operations including:
        causing a vehicle sensor to capture first data, wherein the first data is captured while a vehicle is operated by a first driver to traverse a route;
        accessing second data exclusive of the first data, the second data indicating:
            dynamic contextual attributes of the route, and
            historical driving behaviors exhibited, while traversing the route, by a second driver distinct from the first driver, the historical driving behaviors represented by sensor data;
        determining a safe driving threshold based at least in part on the dynamic contextual attributes and the historical driving behaviors;
        determining that a parameter represented in the first data meets or exceeds the safe driving threshold;
        based at least in part on determining that the parameter meets or exceeds the safe driving threshold, generating an operating instruction; and
        transmitting the operating instruction to a processor of the vehicle, the operating instruction causing the processor of the vehicle to modify an operational behavior of the vehicle such that the parameter is below the safe driving threshold as the vehicle traverses the route.

2. The system of claim 1, wherein the vehicle sensor is fixedly attached to the vehicle or comprises a component of a mobile electronic device disposed in the vehicle.

3. The system of claim 1, wherein the second data includes a second parameter indicating a driving behavior associated with the second driver and a third parameter indicating an operating behavior associated with a second vehicle operated by the second driver.

4. The system of claim 1, wherein the operations further comprise:
    determining that the safe driving threshold differs from a predetermined driving threshold, the predetermined driving threshold corresponding to the route and being established independent of the first data; and
    generating the operating instruction is further based at least in part on determining that the safe driving threshold differs from the predetermined driving threshold.

5. The system of claim 4, wherein causing the processor to modify the operational behavior of the vehicle comprises causing the processor to modify the operational behavior such that the vehicle operates within the safe driving threshold and outside of the predetermined driving threshold.

6. The system of claim 1, wherein the first data further includes data captured by an environmental sensor fixedly disposed in an environment along the route.

7. The system of claim 1, wherein the first data further includes data captured by a second vehicle sensor fixedly attached to a second vehicle in an environment, wherein the second vehicle is distinct from the vehicle.

8. The system of claim 1, wherein the dynamic contextual attributes of the route comprise at least one of weather, road congestion, an environmental condition of the route, or traffic along the route.

9. The system of claim 1, wherein the vehicle sensor comprises at least one of a camera, an optical sensor, a speed sensor, a weight sensor, a noise sensor, a heat sensor, an accelerometer, a location tracking sensor, a proximity sensor, a seat belt sensor, or a sensor to detect an operation of an instrument included in the vehicle.

10. A method comprising:
    causing a vehicle sensor to capture first data, wherein the first data is captured while a vehicle is operated by a first driver to traverse a route;
    accessing second data exclusive of the first data, the second data indicating dynamic contextual attributes of the route and historical driving behaviors exhibited, while traversing the route, by a second driver distinct from the first driver, the historical driving behaviors represented by sensor data;
    determining a safe driving threshold based at least in part on the dynamic contextual attributes and the historical driving behaviors;
    determining that a parameter represented in the first data meets or exceeds the safe driving threshold;
    generating, based at least in part on determining that the parameter meets or exceeds the safe driving threshold, an operating instruction; and transmitting the operating instruction to a processor of the vehicle, the operating instruction causing the processor of the vehicle to modify an operational behavior of the vehicle such that the parameter is below the safe driving threshold as the vehicle traverses the route.

11. The method of claim 10, determining the safe driving threshold is further based at least in part on a weight value generated by a model and associated with the parameter.

12. The method of claim 10, further comprising:
determining that the safe driving threshold differs from a predetermined driving threshold, the predetermined driving threshold corresponding to the route and being established independent of the first data; and
generating the operating instruction is further based at least in part on determining that the safe driving threshold differs from the predetermined driving threshold.

13. The method of claim 10, further comprising:
generating, based at least in part on determining that the parameter meets or exceeds the safe driving threshold, at least one of an alert or a suggested driving behavior; and
transmitting the at least one of the alert or the suggested driving behavior to the vehicle for presentation to the first driver.

14. The method of claim 10, wherein the vehicle sensor is one of a sensor fixedly attached to the vehicle or a sensor configured at a mobile electronic device disposed in the vehicle.

15. The method of claim 14, wherein causing the processor to modify the operational behavior of the vehicle comprises causing the processor to modify the operational behavior such that the vehicle operates within the safe driving threshold and outside of a predetermined driving threshold distinct from the safe driving threshold.

16. The method of claim 10, wherein the vehicle sensor comprises at least one of a camera, an optical sensor, a speed sensor, a weight sensor, a noise sensor, a heat sensor, an accelerometer, a force sensor, a location tracking sensor, a proximity sensor, a seat belt sensor, or a sensor to detect an operation of an instrument included in the vehicle.

17. A non-transitory computer-readable storage medium storing processor-executable instructions that, when executed, cause one or more processors to:
cause a vehicle sensor to capture first data, wherein the first data is captured while a vehicle is operated by a first driver to traverse a route;
access second data exclusive of the first data, the second data indicating dynamic contextual attributes of the route and historical driving behaviors exhibited, while traversing the route, by a second driver distinct from the first driver, the historical driving behaviors represented by sensor data;
determine a safe driving threshold based at least in part on the dynamic contextual attributes and the historical driving behaviors;
determine that a parameter represented in the first data meets or exceeds the safe driving threshold;
generate, based at least in part on determining that the parameter meets or exceeds the safe driving threshold, an operating instruction; and
transmit the operating instruction to a processor of the vehicle, the operating instruction causing the processor of the vehicle to modify an operational behavior of the vehicle such that the parameter is below the safe driving threshold as the vehicle traverses the route.

18. The non-transitory computer-readable storage medium of claim 17, further comprising characterizing a driving event occurring along a portion of the route as being safe based on the safe driving threshold, wherein the driving event would have been characterized as unsafe based on a predetermined driving threshold distinct from the safe driving threshold.

19. The non-transitory computer-readable storage medium of claim 17, wherein the vehicle sensor comprises at least one of a camera, an optical sensor, a speed sensor, a weight sensor, a noise sensor, a heat sensor, an accelerometer, a force sensor, a location tracking sensor, a proximity sensor, a seat belt sensor, or a sensor to detect an operation of an instrument included in the vehicle.

20. A system for determining driver performance, the system comprising:
means for causing a vehicle sensor to capture first data, wherein the first data is captured while a vehicle is operated by a first driver to traverse a route;
means for accessing second data exclusive of the first data, the second data indicating dynamic contextual attributes of the route and historical driving behaviors exhibited, while traversing the route, by a second driver distinct from the first driver, the historical driving behaviors represented by sensor data;
means for determining a safe driving threshold based at least in part on the dynamic contextual attributes and the historical driving behaviors;
means for determining that a parameter represented in the first data meets or exceeds the safe driving threshold;
means for generating, based at least in part on determining that the parameter meets or exceeds the safe driving threshold, an operating instruction; and
means for transmitting the operating instruction to a processor of the vehicle, the operating instruction causing the processor of the vehicle to modify an operational behavior of the vehicle such that the parameter is below the safe driving threshold as the vehicle traverses the route.

* * * * *